US011911608B2

(12) United States Patent
Manicka

(10) Patent No.: US 11,911,608 B2
(45) Date of Patent: Feb. 27, 2024

(54) SUBCUTANEOUS DEVICE FOR PREVENTING AND TREATING ATHEROSCLEROSIS

(71) Applicant: Manicka Institute LLC, Woodbury, MN (US)

(72) Inventor: Yatheendhar D. Manicka, Woodbury, MN (US)

(73) Assignee: Manicka Institute LLC, Woodbury, MN (US)

( * ) Notice: Subject to any disclaimer, the term of this patent is extended or adjusted under 35 U.S.C. 154(b) by 0 days.

(21) Appl. No.: 17/240,799

(22) Filed: Apr. 26, 2021

(65) Prior Publication Data

US 2022/0339433 A1 Oct. 27, 2022

(51) Int. Cl.
| | |
|---|---|
| *A61N 1/05* | (2006.01) |
| *A61N 1/375* | (2006.01) |
| *A61N 1/372* | (2006.01) |
| *A61N 1/40* | (2006.01) |
| *A61N 1/32* | (2006.01) |

(52) U.S. Cl.
CPC .......... *A61N 1/059* (2013.01); *A61N 1/0504* (2013.01); *A61N 1/0573* (2013.01); *A61N 1/32* (2013.01); *A61N 1/37518* (2017.08); *A61N 1/40* (2013.01)

(58) Field of Classification Search
None
See application file for complete search history.

(56) References Cited

U.S. PATENT DOCUMENTS

| | | | |
|---|---|---|---|
| 3,923,060 | A | 12/1975 | Ellinwood, Jr. |
| 4,030,509 | A | 6/1977 | Heilman et al. |
| 4,256,115 | A | 3/1981 | Bilitch |
| 4,291,707 | A | 9/1981 | Heilman et al. |
| 4,643,202 | A | 2/1987 | Roche |
| 4,683,895 | A | 8/1987 | Pohndorf |
| 4,817,634 | A | 4/1989 | Holleman et al. |

(Continued)

FOREIGN PATENT DOCUMENTS

| | | |
|---|---|---|
| CN | 104470580 A | 3/2015 |
| CN | 106362288 A | 2/2017 |

(Continued)

OTHER PUBLICATIONS

International Search Report and Written Opinion for PCT Application No. PCT/US2021/029151, dated Aug. 17, 2021, 8 pages.

(Continued)

*Primary Examiner* — Erica S Lee
(74) *Attorney, Agent, or Firm* — Kinney & Lange, P.A.

(57) ABSTRACT

A subcutaneously implantable device includes a housing and an anchoring mechanism attached to the housing that is configured to anchor the device to a muscle, a bone, and/or a first tissue. The device further includes a first prong with a proximal end attached to the housing and a distal end extending away from the housing that is configured to be positioned adjacent to a first blood vessel, and a first electrode on the distal end of the first prong that is configured to be positioned adjacent to the first blood vessel. Circuitry in the housing is in electrical communication with the first electrode that is configured to deliver electrical stimulation using the electrode to create an electric field around the blood vessel.

28 Claims, 23 Drawing Sheets

(56) References Cited

U.S. PATENT DOCUMENTS

| | | |
|---|---|---|
| 4,827,932 A | 5/1989 | Ideker et al. |
| 4,971,070 A | 11/1990 | Holleman et al. |
| 4,991,578 A | 2/1991 | Cohen |
| 5,042,463 A | 8/1991 | Lekholm |
| 5,243,977 A | 9/1993 | Trabucco et al. |
| 5,247,945 A | 9/1993 | Heinze et al. |
| 5,327,909 A | 7/1994 | Kiser et al. |
| 5,496,362 A | 3/1996 | Kenknight et al. |
| 5,509,924 A | 4/1996 | Paspa et al. |
| 5,545,202 A | 8/1996 | Dahl et al. |
| 5,674,259 A | 10/1997 | Gray |
| 5,792,208 A | 8/1998 | Gray |
| 5,897,586 A | 4/1999 | Molina |
| 5,916,243 A | 6/1999 | Kenknight et al. |
| 5,954,757 A | 9/1999 | Gray |
| 6,044,300 A | 3/2000 | Gray |
| 6,152,955 A | 11/2000 | Kenknight et al. |
| 6,169,922 B1 | 1/2001 | Alferness et al. |
| 6,201,991 B1 * | 3/2001 | Chekanov .............. A61N 1/326 607/2 |
| 6,411,845 B1 | 6/2002 | Mower |
| 6,564,094 B2 | 5/2003 | Alferness et al. |
| 6,567,699 B2 | 5/2003 | Alferness et al. |
| 6,647,292 B1 | 11/2003 | Bardy et al. |
| 6,662,035 B2 | 12/2003 | Sochor |
| 6,689,053 B1 | 2/2004 | Shaw et al. |
| 7,054,692 B1 | 5/2006 | Whitehurst et al. |
| 7,085,606 B2 | 8/2006 | Flach et al. |
| 7,118,567 B2 | 10/2006 | Donovan |
| 7,146,226 B2 | 12/2006 | Lau et al. |
| 7,155,295 B2 | 12/2006 | Lau et al. |
| 7,158,824 B2 | 1/2007 | Girouard et al. |
| 7,158,839 B2 | 1/2007 | Lau |
| 7,164,952 B2 | 1/2007 | Lau et al. |
| 7,197,362 B2 | 3/2007 | Westlund |
| 7,225,036 B2 | 5/2007 | Lau et al. |
| 7,239,918 B2 | 7/2007 | Strother et al. |
| 7,272,448 B1 | 9/2007 | Morgan et al. |
| 7,288,096 B2 | 10/2007 | Chin |
| 7,460,911 B2 | 12/2008 | Cosendai et al. |
| 7,512,441 B2 | 3/2009 | Zhang et al. |
| 7,526,342 B2 | 4/2009 | Chin et al. |
| 7,558,631 B2 | 7/2009 | Cowan et al. |
| 7,587,238 B2 | 9/2009 | Moffitt et al. |
| 7,610,092 B2 | 10/2009 | Cowan et al. |
| 7,630,760 B2 | 12/2009 | Libbus et al. |
| 7,738,953 B2 | 6/2010 | Zhu et al. |
| 7,765,012 B2 | 7/2010 | Gerber |
| 7,813,797 B2 | 10/2010 | Bardy et al. |
| 7,899,537 B1 | 3/2011 | Kroll et al. |
| 7,931,646 B2 | 4/2011 | Donovan |
| 8,036,757 B2 | 10/2011 | Worley |
| 8,060,219 B2 | 11/2011 | Ross et al. |
| 8,131,362 B2 | 3/2012 | Moffitt et al. |
| 8,315,701 B2 | 11/2012 | Cowan et al. |
| 8,359,094 B2 | 1/2013 | Bonner et al. |
| 8,386,050 B2 | 2/2013 | Donoghue et al. |
| 8,469,874 B2 | 6/2013 | Forsell |
| 8,475,355 B2 | 7/2013 | Forsell |
| 8,483,841 B2 | 7/2013 | Sanghera et al. |
| 8,506,474 B2 | 8/2013 | Chin et al. |
| 8,509,894 B2 | 8/2013 | Forsell |
| 8,630,710 B2 | 1/2014 | Kumar et al. |
| 8,688,211 B2 | 4/2014 | Libbus et al. |
| 8,696,745 B2 | 4/2014 | Forsell |
| 8,731,663 B2 | 5/2014 | Bianchi et al. |
| 8,886,311 B2 | 11/2014 | Anderson et al. |
| 9,005,104 B2 | 4/2015 | Forsell |
| 9,008,776 B2 | 4/2015 | Cowan et al. |
| 9,079,035 B2 | 7/2015 | Sanghera et al. |
| 9,180,235 B2 | 11/2015 | Forsell |
| 9,216,285 B1 | 12/2015 | Boling et al. |
| 9,364,595 B2 | 6/2016 | Forsell |
| 9,393,407 B2 | 7/2016 | Bar-Cohen et al. |
| 9,398,901 B2 | 7/2016 | Tischendorf et al. |
| 9,433,459 B2 | 9/2016 | Totman et al. |
| 9,457,137 B2 | 10/2016 | Forsell |
| 9,492,669 B2 | 11/2016 | Demmer et al. |
| 9,511,233 B2 | 12/2016 | Sambelashvili |
| 9,597,514 B2 | 3/2017 | Khairkhahan et al. |
| 9,656,009 B2 | 5/2017 | Kheradvar et al. |
| 9,717,898 B2 | 8/2017 | Thompson-Nauman et al. |
| 9,717,923 B2 | 8/2017 | Thompson-Nauman et al. |
| 9,731,055 B2 | 8/2017 | Forsell |
| 9,789,319 B2 | 10/2017 | Sambelashvili |
| 9,884,194 B2 | 2/2018 | Legay et al. |
| 9,925,318 B2 | 3/2018 | Forsell |
| 10,086,206 B2 | 10/2018 | Sambelashvili |
| 10,092,745 B2 | 10/2018 | Tockman et al. |
| 10,226,618 B2 | 3/2019 | Reddy et al. |
| 10,279,170 B2 | 5/2019 | Syed et al. |
| 10,471,251 B1 | 11/2019 | Manicka |
| 10,556,047 B2 | 2/2020 | Forsell |
| 10,569,078 B1 | 2/2020 | Manicka |
| 10,569,093 B1 | 2/2020 | Manicka |
| 10,576,291 B2 | 3/2020 | Manicka |
| 10,596,383 B2 | 3/2020 | Ghosh |
| 10,603,487 B2 | 3/2020 | Tockman et al. |
| 10,639,483 B2 | 5/2020 | Manicka |
| 10,646,721 B2 | 5/2020 | Manicka |
| 10,661,080 B2 | 5/2020 | Tholakanahalli et al. |
| 10,716,511 B2 | 7/2020 | Manicka |
| 10,716,933 B2 | 7/2020 | Manicka |
| 10,765,858 B2 | 9/2020 | Marshall et al. |
| 10,894,155 B2 | 1/2021 | Manicka |
| 10,981,002 B2 | 4/2021 | Rys |
| 2002/0095139 A1 | 7/2002 | Keogh et al. |
| 2002/0123674 A1 | 9/2002 | Plicchi et al. |
| 2004/0015204 A1 | 1/2004 | Whitehurst et al. |
| 2004/0054391 A1 | 3/2004 | Wildon |
| 2004/0215280 A1 | 10/2004 | Dublin et al. |
| 2004/0230273 A1 | 11/2004 | Cates et al. |
| 2005/0010259 A1 | 1/2005 | Gerber |
| 2005/0113901 A1 | 5/2005 | Coe et al. |
| 2005/0137673 A1 | 6/2005 | Lau et al. |
| 2005/0171589 A1 | 8/2005 | Lau et al. |
| 2005/0228470 A1 | 10/2005 | Osypka |
| 2005/0288715 A1 | 12/2005 | Lau et al. |
| 2006/0004398 A1 | 1/2006 | Binder et al. |
| 2006/0009675 A1 | 1/2006 | Meyer |
| 2006/0009831 A1 | 1/2006 | Lau et al. |
| 2006/0041276 A1 | 2/2006 | Chan |
| 2006/0116743 A1 | 6/2006 | Gibson et al. |
| 2006/0116746 A1 | 6/2006 | Chin |
| 2006/0155180 A1 | 7/2006 | Brister et al. |
| 2006/0247748 A1 | 11/2006 | Wahlstrand et al. |
| 2006/0287682 A1 | 12/2006 | Cohen et al. |
| 2006/0293740 A1 | 12/2006 | Heil et al. |
| 2007/0004979 A1 | 1/2007 | Wojciechowicz et al. |
| 2007/0043394 A1 | 2/2007 | Zhang et al. |
| 2007/0043416 A1 | 2/2007 | Callas et al. |
| 2007/0055091 A1 | 3/2007 | Lau et al. |
| 2007/0055310 A1 | 3/2007 | Lau |
| 2007/0106359 A1 | 5/2007 | Schaer et al. |
| 2007/0112390 A1 | 5/2007 | Lau et al. |
| 2007/0123923 A1 | 5/2007 | Lindstrom et al. |
| 2007/0173915 A1 | 7/2007 | Westlund |
| 2007/0185535 A1 | 8/2007 | Libbus et al. |
| 2007/0197859 A1 | 8/2007 | Schaer et al. |
| 2007/0255295 A1 | 11/2007 | Starkebaum et al. |
| 2007/0265669 A1 | 11/2007 | Roline et al. |
| 2008/0132915 A1 * | 6/2008 | Buckman .............. A61B 17/083 206/339 |
| 2008/0132981 A1 | 6/2008 | Gerber |
| 2008/0132982 A1 | 6/2008 | Gerber |
| 2008/0243217 A1 | 10/2008 | Wildon |
| 2008/0243220 A1 | 10/2008 | Barker |
| 2008/0319503 A1 | 12/2008 | Honeck et al. |
| 2009/0030469 A1 | 1/2009 | Meiry |
| 2009/0082828 A1 | 3/2009 | Ostroff |
| 2009/0209986 A1 | 8/2009 | Stewart et al. |
| 2009/0275998 A1 | 11/2009 | Burnes et al. |
| 2009/0275999 A1 | 11/2009 | Burnes et al. |
| 2009/0287266 A1 | 11/2009 | Zdeblick |

(56) References Cited

U.S. PATENT DOCUMENTS

| | | |
|---|---|---|
| 2009/0299447 A1 | 12/2009 | Jensen et al. |
| 2010/0016916 A1 | 1/2010 | Arcot-Krishnamurthy et al. |
| 2010/0022873 A1 | 1/2010 | Hunter et al. |
| 2010/0042108 A1 | 2/2010 | Hibino |
| 2010/0100079 A1 | 4/2010 | Berkcan et al. |
| 2010/0114287 A1 | 5/2010 | Privitera et al. |
| 2010/0152798 A1 | 6/2010 | Sanghera et al. |
| 2010/0198288 A1 | 8/2010 | Ostroff |
| 2010/0241181 A1 | 9/2010 | Savage et al. |
| 2010/0268041 A1 | 10/2010 | Kraemer et al. |
| 2010/0274313 A1 | 10/2010 | Boling et al. |
| 2011/0034219 A1* | 2/2011 | Filson ............... H05K 5/0017 455/575.1 |
| 2011/0190692 A1 | 8/2011 | Manda |
| 2011/0196193 A1 | 8/2011 | Forsell |
| 2011/0196483 A1* | 8/2011 | Forsell ............... A61M 60/468 623/3.1 |
| 2011/0196484 A1 | 8/2011 | Forsell |
| 2011/0257504 A1 | 10/2011 | Hendricks et al. |
| 2012/0029335 A1 | 2/2012 | Sudam et al. |
| 2012/0172892 A1 | 7/2012 | Grubac et al. |
| 2012/0330123 A1 | 12/2012 | Doerr |
| 2013/0073003 A1 | 3/2013 | Pless et al. |
| 2013/0085513 A1 | 4/2013 | North |
| 2013/0116529 A1 | 5/2013 | Min et al. |
| 2013/0138173 A1 | 5/2013 | Bianchi et al. |
| 2013/0218195 A1 | 8/2013 | Kleshinski et al. |
| 2013/0238067 A1 | 9/2013 | Baudino |
| 2014/0074093 A9 | 3/2014 | Nelson et al. |
| 2014/0081154 A1 | 3/2014 | Toth |
| 2014/0081158 A1 | 3/2014 | Bodecker et al. |
| 2014/0088611 A1 | 3/2014 | Richardson |
| 2014/0114371 A1 | 4/2014 | Westlund et al. |
| 2014/0128935 A1 | 5/2014 | Kumar et al. |
| 2014/0163579 A1* | 6/2014 | Tischendorf ......... A61N 1/3756 606/129 |
| 2014/0309683 A1 | 10/2014 | Bagwell et al. |
| 2014/0309699 A1 | 10/2014 | Houff |
| 2014/0330248 A1 | 11/2014 | Thompson-Nauman et al. |
| 2014/0330287 A1 | 11/2014 | Thompson-Nauman et al. |
| 2014/0330325 A1 | 11/2014 | Thompson-Nauman et al. |
| 2014/0330326 A1 | 11/2014 | Thompson-Nauman et al. |
| 2014/0330327 A1 | 11/2014 | Thompson-Nauman et al. |
| 2014/0330329 A1 | 11/2014 | Thompson-Nauman et al. |
| 2014/0330331 A1 | 11/2014 | Thompson-Nauman et al. |
| 2015/0025591 A1 | 1/2015 | Sunagawa et al. |
| 2015/0057563 A1 | 2/2015 | Kowalski et al. |
| 2015/0126833 A1 | 5/2015 | Anderson et al. |
| 2015/0142070 A1 | 5/2015 | Sambelashvili |
| 2015/0257755 A1 | 9/2015 | North |
| 2015/0305639 A1 | 10/2015 | Greenhut et al. |
| 2015/0306377 A1 | 10/2015 | Brantigan |
| 2015/0321016 A1 | 11/2015 | O'Brien et al. |
| 2015/0342627 A1 | 12/2015 | Thompson-Nauman et al. |
| 2015/0343176 A1 | 12/2015 | Asleson et al. |
| 2015/0343197 A1 | 12/2015 | Gardeski et al. |
| 2015/0359513 A1 | 12/2015 | Caluser |
| 2015/0366556 A1 | 12/2015 | Khairkhahan et al. |
| 2016/0067478 A1 | 3/2016 | McGeehan et al. |
| 2016/0067479 A1 | 3/2016 | Marcovecchio et al. |
| 2016/0067480 A1 | 3/2016 | Sanghera et al. |
| 2016/0067488 A1 | 3/2016 | Sanghera et al. |
| 2016/0121106 A1 | 5/2016 | Marshall et al. |
| 2016/0129169 A1 | 5/2016 | Forsell |
| 2016/0129263 A1 | 5/2016 | Demmer et al. |
| 2016/0144192 A1 | 5/2016 | Sanghera et al. |
| 2016/0158567 A1 | 6/2016 | Marshall et al. |
| 2016/0175580 A1 | 6/2016 | Marshall et al. |
| 2016/0228713 A1 | 8/2016 | Bar-Cohen et al. |
| 2017/0020551 A1 | 1/2017 | Reddy et al. |
| 2017/0021159 A1 | 1/2017 | Reddy et al. |
| 2017/0043173 A1 | 2/2017 | Sharma et al. |
| 2017/0164939 A1 | 6/2017 | Ryshkus et al. |
| 2017/0224995 A1 | 8/2017 | Sanghera et al. |
| 2017/0304019 A1 | 10/2017 | Sanghera et al. |
| 2017/0304634 A1 | 10/2017 | Sanghera et al. |
| 2017/0319863 A1 | 11/2017 | Thompson-Nauman et al. |
| 2018/0021572 A1 | 1/2018 | McGeehan et al. |
| 2018/0036547 A1 | 2/2018 | Reddy |
| 2018/0050199 A1 | 2/2018 | Sanghera et al. |
| 2018/0085593 A1 | 3/2018 | Fayram et al. |
| 2018/0117307 A1 | 5/2018 | Whitman et al. |
| 2018/0133494 A1 | 5/2018 | Reddy |
| 2018/0193060 A1 | 7/2018 | Reddy et al. |
| 2018/0235353 A1* | 8/2018 | Chen ................... H05K 5/0204 |
| 2018/0243570 A1 | 8/2018 | Malinowski et al. |
| 2018/0272122 A1 | 9/2018 | Rys |
| 2018/0361145 A1 | 12/2018 | Mahapatra et al. |
| 2019/0105489 A1 | 4/2019 | Thompson-Nauman et al. |
| 2019/0117959 A1 | 4/2019 | Reddy |
| 2019/0224477 A1 | 7/2019 | Syed et al. |
| 2019/0254771 A1 | 8/2019 | Swift et al. |
| 2019/0321624 A1 | 10/2019 | De Kock et al. |
| 2019/0374695 A1 | 12/2019 | Kheradvar |
| 2020/0023177 A1 | 1/2020 | Sanghera et al. |
| 2020/0077953 A1* | 3/2020 | Manicka ............... A61B 5/6878 |
| 2020/0129755 A1 | 4/2020 | Thompson-Nauman et al. |
| 2020/0139108 A1 | 5/2020 | Strommer et al. |
| 2020/0147365 A1 | 5/2020 | Marshall et al. |
| 2020/0215320 A1 | 7/2020 | Tockman et al. |
| 2021/0038276 A1* | 2/2021 | Schwägli ........... A61B 17/8866 |
| 2021/0069491 A1 | 3/2021 | Grubac et al. |

FOREIGN PATENT DOCUMENTS

| | | |
|---|---|---|
| CN | 107233665 A | 10/2017 |
| EP | 458265 A2 | 11/1991 |
| EP | 280564 B1 | 6/1993 |
| EP | 602356 A2 | 6/1994 |
| EP | 627237 A1 | 12/1994 |
| EP | 460324 B1 | 3/1996 |
| EP | 2281600 A1 | 2/2011 |
| EP | 2119471 B1 | 8/2011 |
| EP | 2069012 B1 | 5/2017 |
| EP | 2349381 B1 | 12/2019 |
| EP | 2349382 B1 | 12/2019 |
| EP | 2349385 B1 | 12/2019 |
| JP | 2010502274 A | 1/2010 |
| JP | 2014054549 A | 3/2014 |
| WO | 8202664 A1 | 8/1982 |
| WO | 9220402 A1 | 11/1992 |
| WO | 9408657 A1 | 4/1994 |
| WO | 0028918 A1 | 5/2000 |
| WO | 0191850 A1 | 12/2001 |
| WO | 02087688 A1 | 11/2002 |
| WO | 2004028348 A2 | 4/2004 |
| WO | 2004073506 A2 | 9/2004 |
| WO | 2005046789 A1 | 5/2005 |
| WO | 2005092431 A1 | 10/2005 |
| WO | 2006083617 A2 | 8/2006 |
| WO | 2006107590 A2 | 10/2006 |
| WO | 2007005641 A2 | 1/2007 |
| WO | 2007103262 A2 | 9/2007 |
| WO | 2007133947 A2 | 11/2007 |
| WO | 2008051926 A1 | 5/2008 |
| WO | 2010014472 A1 | 2/2010 |
| WO | 2010042014 A1 | 4/2010 |
| WO | 2010042016 A1 | 4/2010 |
| WO | 2010042017 A1 | 4/2010 |
| WO | 2010042018 A1 | 4/2010 |
| WO | 2013152259 A1 | 10/2013 |
| WO | WO2018104476 A1 | 6/2018 |
| WO | 2020102331 A1 | 5/2020 |

OTHER PUBLICATIONS

International Search Report and Written Opinion for PCT/US2019/028373, dated Aug. 19, 2019, 15 pages.

Invitation to Pay Additional Fees and, Where Applicable, Protest Fee for PCT Application No. PCT/US2019/028373, dated Jun. 6, 2019, 2 pages.

International Search Report and Written Opinion for PCT Application No. PCT/US2020/059732 dated Feb. 4, 2021, 10 pages.

(56) References Cited

OTHER PUBLICATIONS

International Search Report and Written Opinion for PCT Application No. PCT/US2020/059733, dated Feb. 5, 2021, 7 pages.
Gharaibeh et al., "Pulsed Electromagnetic Charges in the Management of Coronary Artery Atherosclerosis-Clinic Research," American-Eurasian Journal of Scientific Research 11 (1): 01-04, 2016.
International Search Report and Written Opinion for PCT Application No. PCT/US21/60627, dated Feb. 7, 2022, 12 pages.
International Search Report and Written Opinion for PCT Application No. PCT/US21/60621, dated Feb. 8, 2022, 12 pages.
International Search Report and Written Opinion for PCT Application No. PCT/US21/60625, dated Feb. 18, 2022, 20 pages.
International Search Report and Written Opinion for PCT Application No. PCT/US21/60623, dated Feb. 22, 2022, 7 pages.
International Search Report and Written Opinion for PCT Application No. PCT/US2022/011029, dated Mar. 24, 2022, 11 pages.
Extended European Search Report for European Patent Application No. 19843134.8, dated Apr. 25, 2022, 6 pages.
International Search Report and Written Opinion for PCT Application No. PCT/US2022/026160, dated Jul. 8, 2022, 12 pages.
Indian First Examination Report for Indian Patent Application No. 202117003908, dated Mar. 3, 2023, 7 pages.
First Review of the Opinion Circular for Chinese Application No. 2019800003911.0, dated Feb. 16, 2023, 26 pages.
First Review of the Opinion Circular for Chinese Application No. 202011196767.8, dated Mar. 11, 2023, 17 pages.
First Review of the Opinion Circular for Chinese Application No. 202011192123.1, dated Mar. 9, 2023, 17 pages.
First Review of the Opinion Circular for Chinese Application No. 202011192209.4, dated Mar. 10, 2023, 24 pages.
Notice of Reasons for Refusal for Japanese Patent Application No. 2021529225, dated Mar. 15, 2023, 17 pages.
Second Chinese Office Action for Chinese Application No. 202011192209.4, dated Aug. 25, 2023, 18 pages.
Second Chinese Office Action for Chinese Application No. 201980003911.0, dated Oct. 23, 2023, 17 pages.
Extended European Search Report for European Patent Application No. 20887687.0, dated Nov. 15, 2023, 6 pages.
Extended European Search Report for European Patent Application No. 20887104.6, dated Nov. 15, 2023, 5 pages.

* cited by examiner

SUBCUTANEOUS DEVICE FOR PREVENTING AND TREATING ATHEROSCLEROSIS

BACKGROUND

The present disclosure relates to implantable medical devices, and in particular, to a subcutaneous device for preventing and treating atherosclerosis.

Implantable medical devices include medical devices that are implanted in the body. Implantable medical devices can be monitoring devices that sense signals from the body for monitoring medical conditions, diagnostic devices that sense signals from the body to diagnose medical conditions, and/or therapeutic devices that provide therapy to the body to treat medical conditions. Implantable medical devices can be used to treat many medical conditions.

Atherosclerosis is a medical condition that afflicts many people. Atherosclerosis is a build-up of plaque (fatty and liver deposits) in blood vessels that causes a hardening and narrowing of the blood vessel. Atherosclerosis can lead to heart attacks, strokes, and peripheral vascular disease. Plaque build-up in the blood vessels can occlude the blood vessels and prevent blood from flowing through the blood vessel. Any organ or tissue that is being supported by the flow of blood through the occluded blood vessel will die due to a lack of blood. Further, if a piece of the built-up plaque breaks off, it can lodge in and block smaller blood vessels and cause a heart attack or a stroke.

Atherosclerosis is traditionally treated in a number of ways. Statins can be prescribed to patients who have risk factors for atherosclerosis (for example high cholesterol) or who have been diagnosed with the beginning stages of atherosclerosis. Statins can have many side effects and patients have to continually take statins for the remainder of their lives in order to prevent plaque build-up. When plaque build-up has advanced to an occlusion or blockage in the blood vessel, surgical procedures may be needed. A less invasive surgical procedure can include the placement of a stent in the blood vessel. A guide wire is routed through the blood vessel to the plaque build-up and a stent can be deployed to push the plaque outward and expand the blood vessel to allow for more blood flow through the blood vessel. A more invasive surgical procedure can include a coronary artery bypass graft in which a portion of a blood vessel from another part of the body is used to reroute blood flow around a plaque build-up. Coronary artery bypass graft procedures are typically performed after heart attacks as emergency life-saving surgeries.

SUMMARY

A subcutaneously implantable device includes a housing and an anchoring mechanism attached to the housing that is configured to anchor the device to a muscle, a bone, and/or a first tissue. The device further includes a first prong with a proximal end attached to the housing and a distal end extending away from the housing that is configured to be positioned adjacent to a first blood vessel, and a first electrode on the distal end of the first prong that is configured to be positioned adjacent to the first blood vessel. Circuitry in the housing is in electrical communication with the first electrode that is configured to deliver electrical stimulation using the electrode to create an electric field around the blood vessel.

A method of preventing and treating atherosclerosis using a subcutaneous device includes anchoring a housing of the device to a muscle, a bone, and/or a first tissue using an anchoring mechanism attached to the housing. Electrical stimulation is transmitted from circuitry in the housing to a first electrode on a distal end of a first prong positioned adjacent to a first blood vessel, thereby creating an electric field around the first blood vessel. The first prong has a proximal end attached to the housing and the distal end extends away from the housing. An electric field is created around the first blood vessel with the electrical stimulation from the first electrode.

BRIEF DESCRIPTION OF THE DRAWINGS

Subcutaneous Device 100

Subcutaneous Device 300

Figure 9:
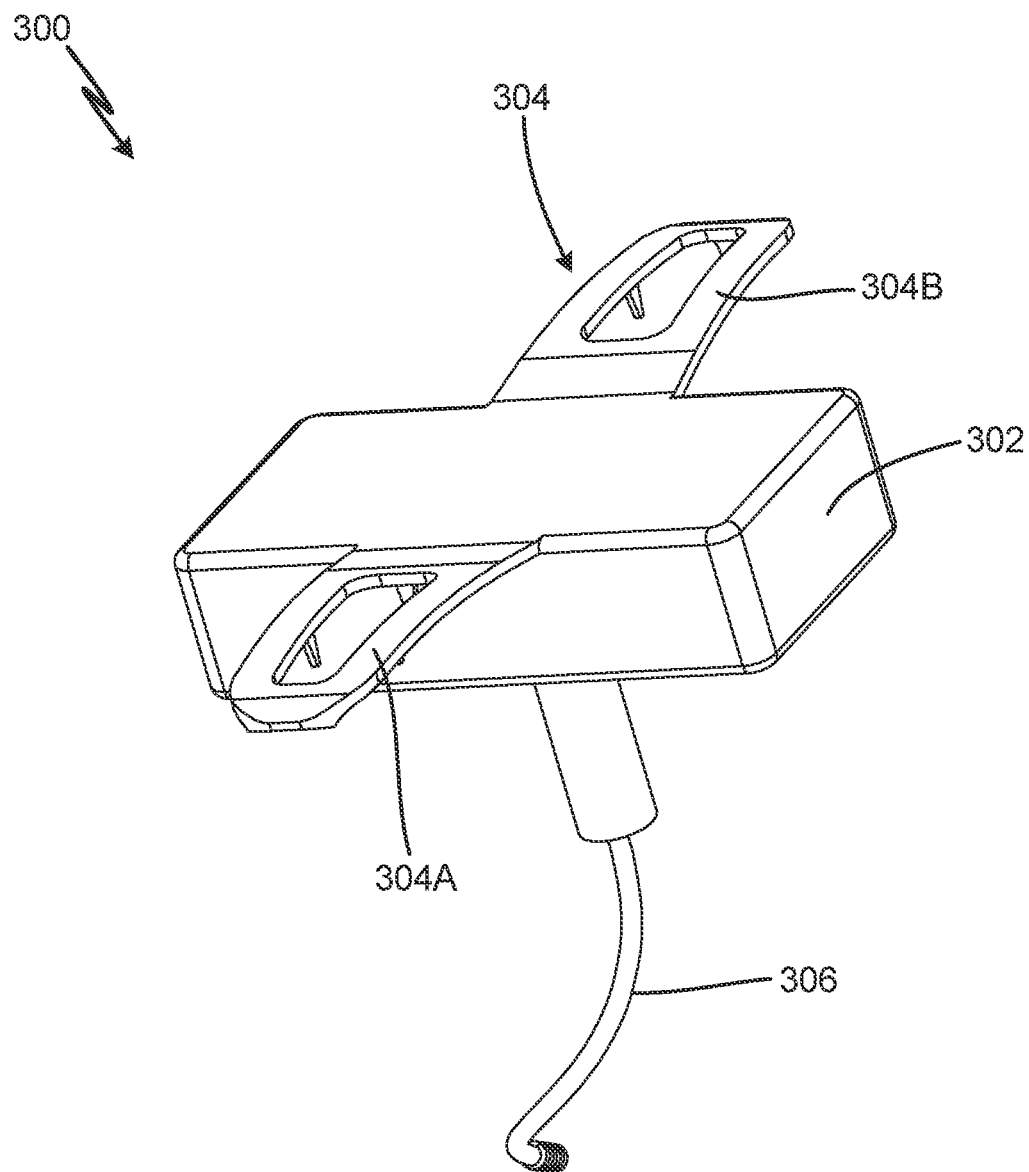

FIG. 9 is a front perspective view of a second embodiment of a subcutaneous device.

Figure 10:
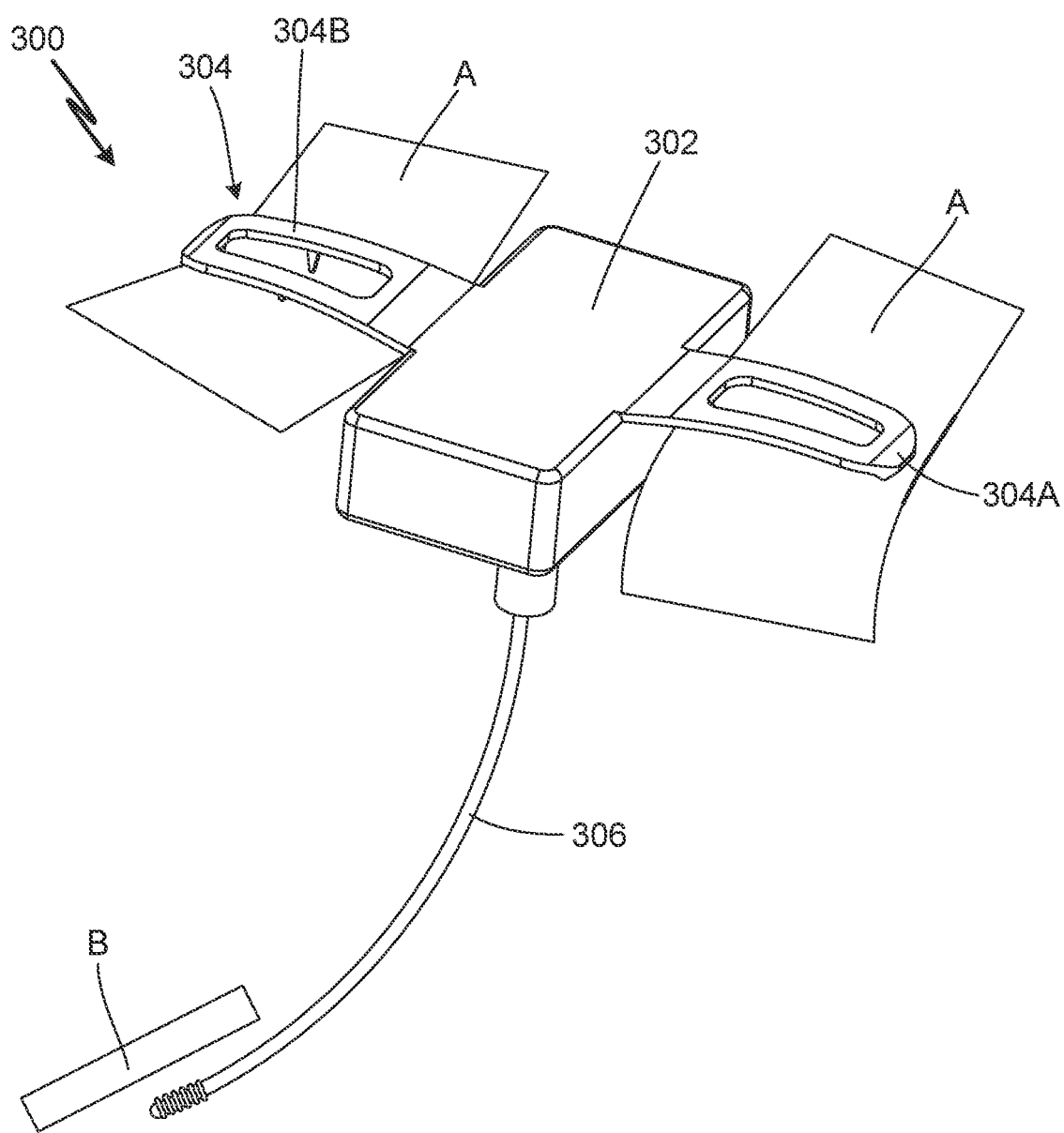

FIG. 10 is a back perspective view of the second embodiment of the subcutaneous device anchored to structural body component(s) A.

Figure 11A:
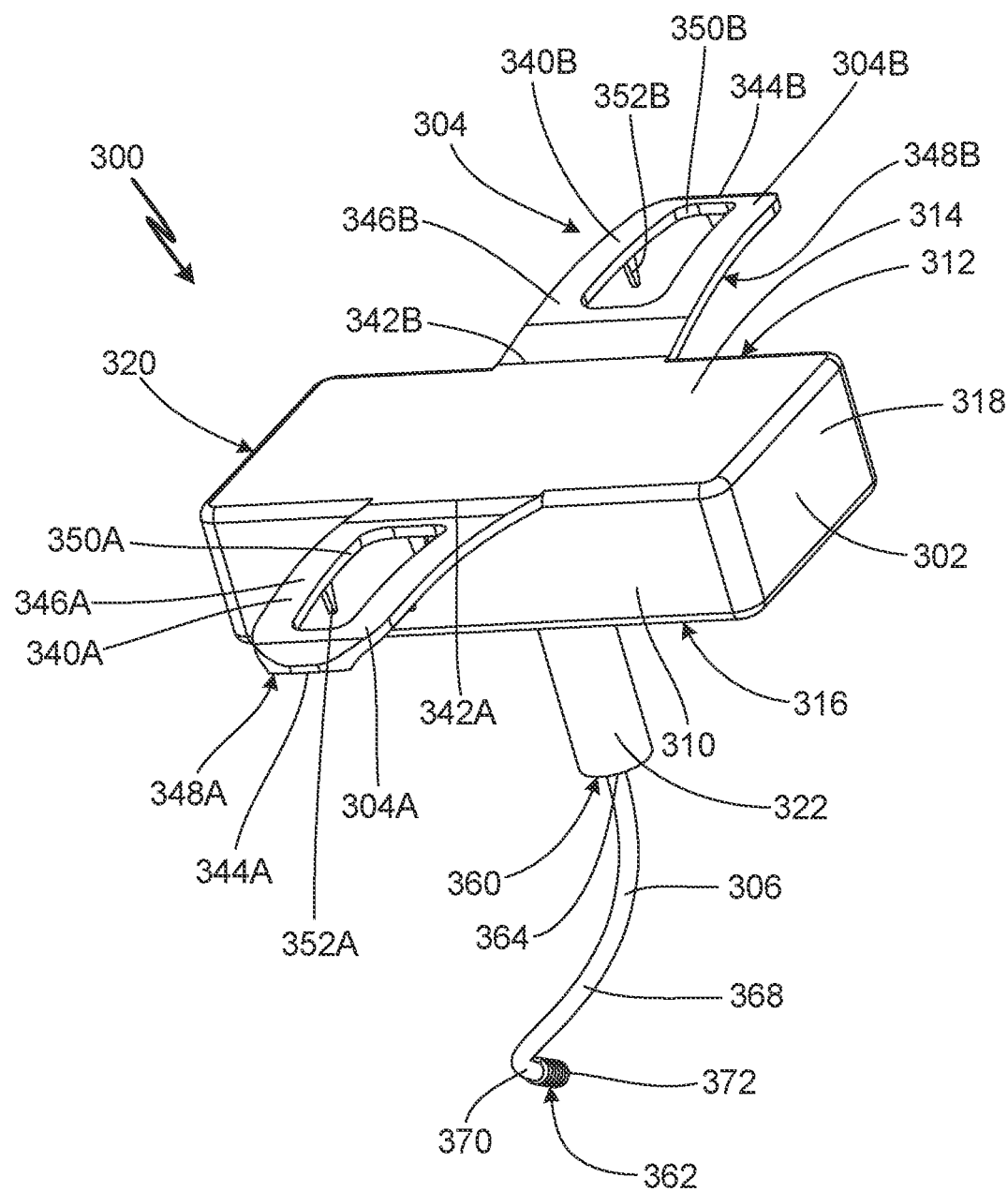

FIG. 11A is a front perspective view of the second embodiment of the subcutaneous device.

Figure 11B:
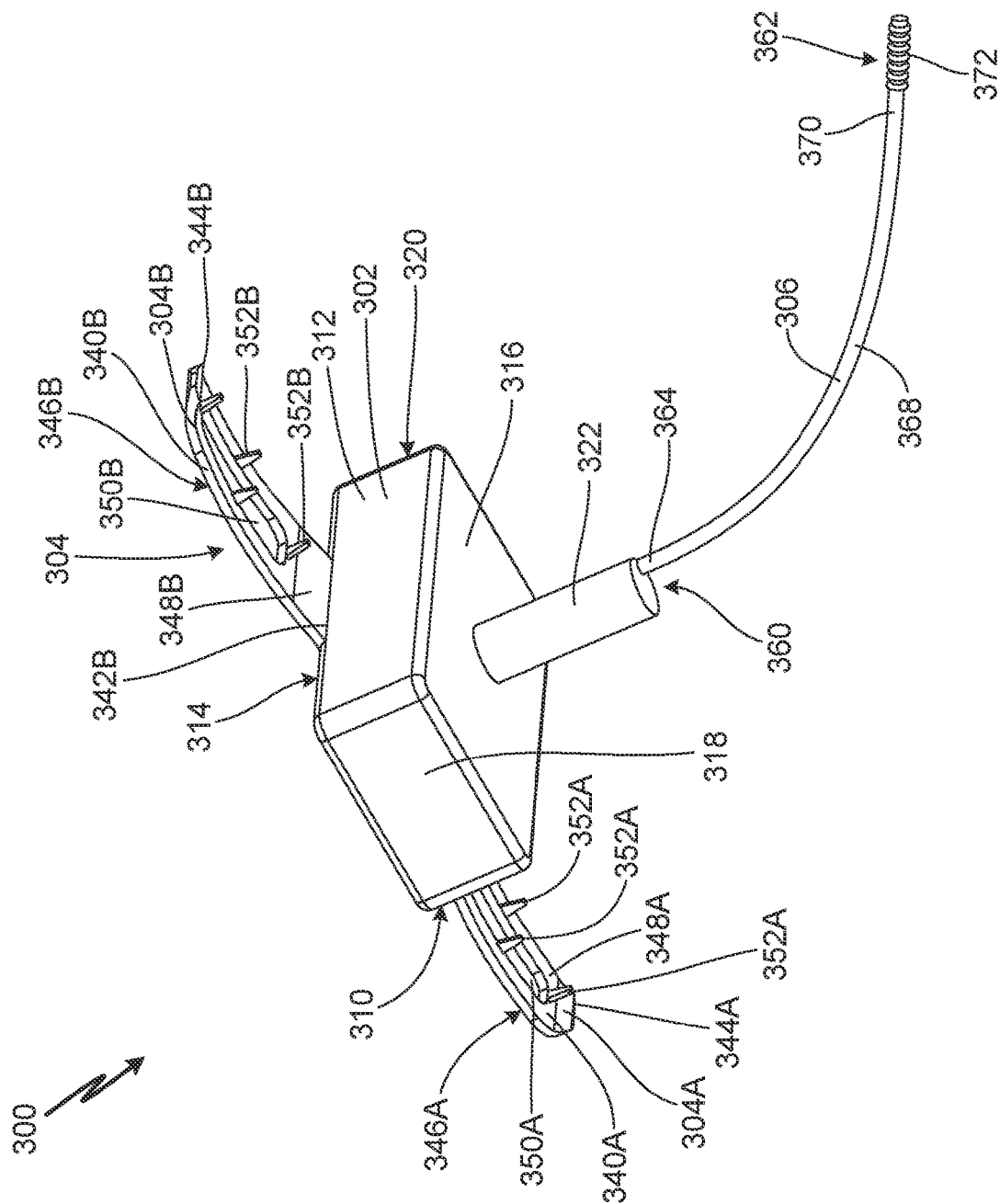

FIG. 11B is a bottom perspective view of the second embodiment of the subcutaneous device.

Figure 12:
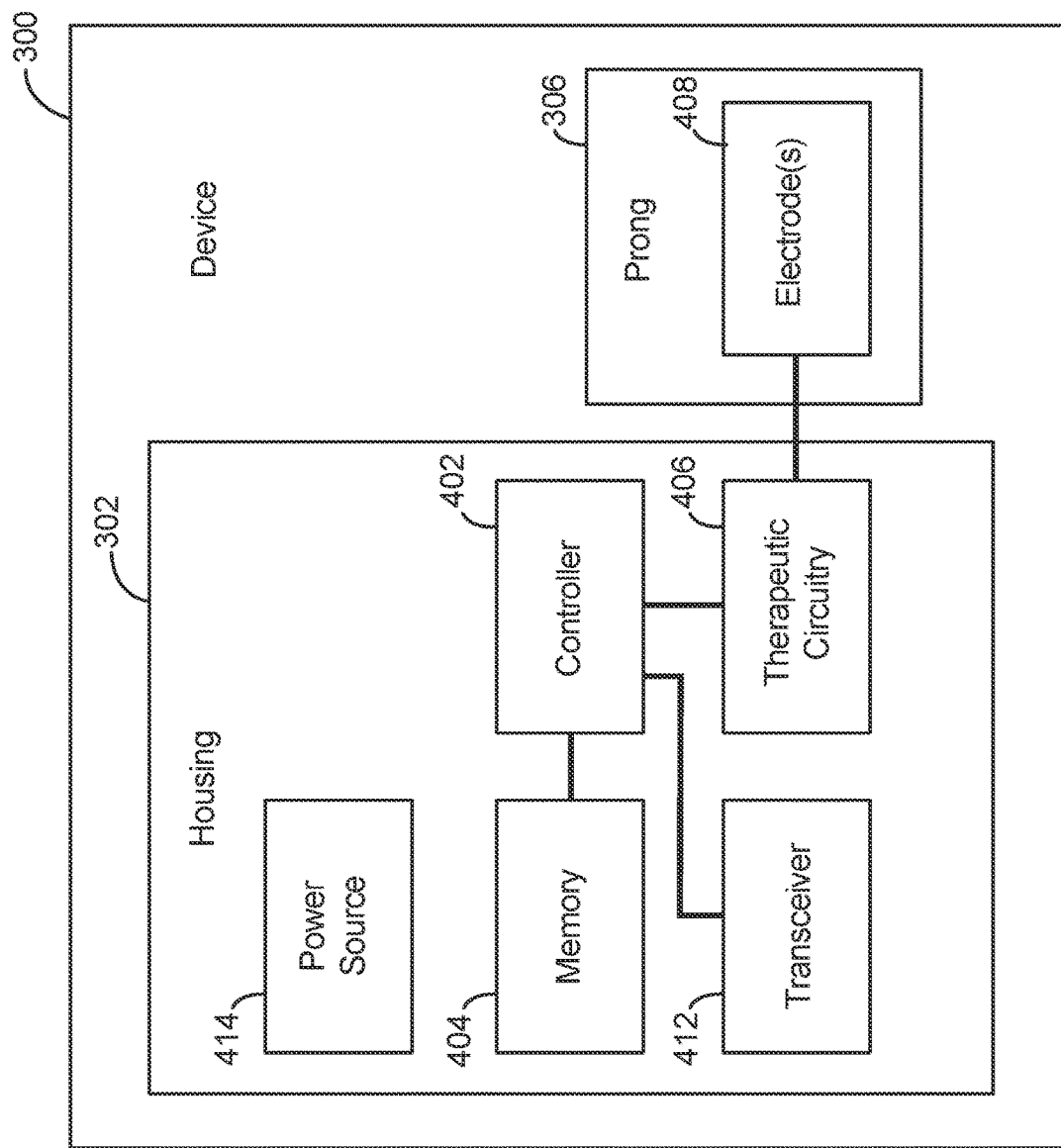

FIG. 12 is a functional block diagram of the first embodiment of the subcutaneous device.

Figure 13A:
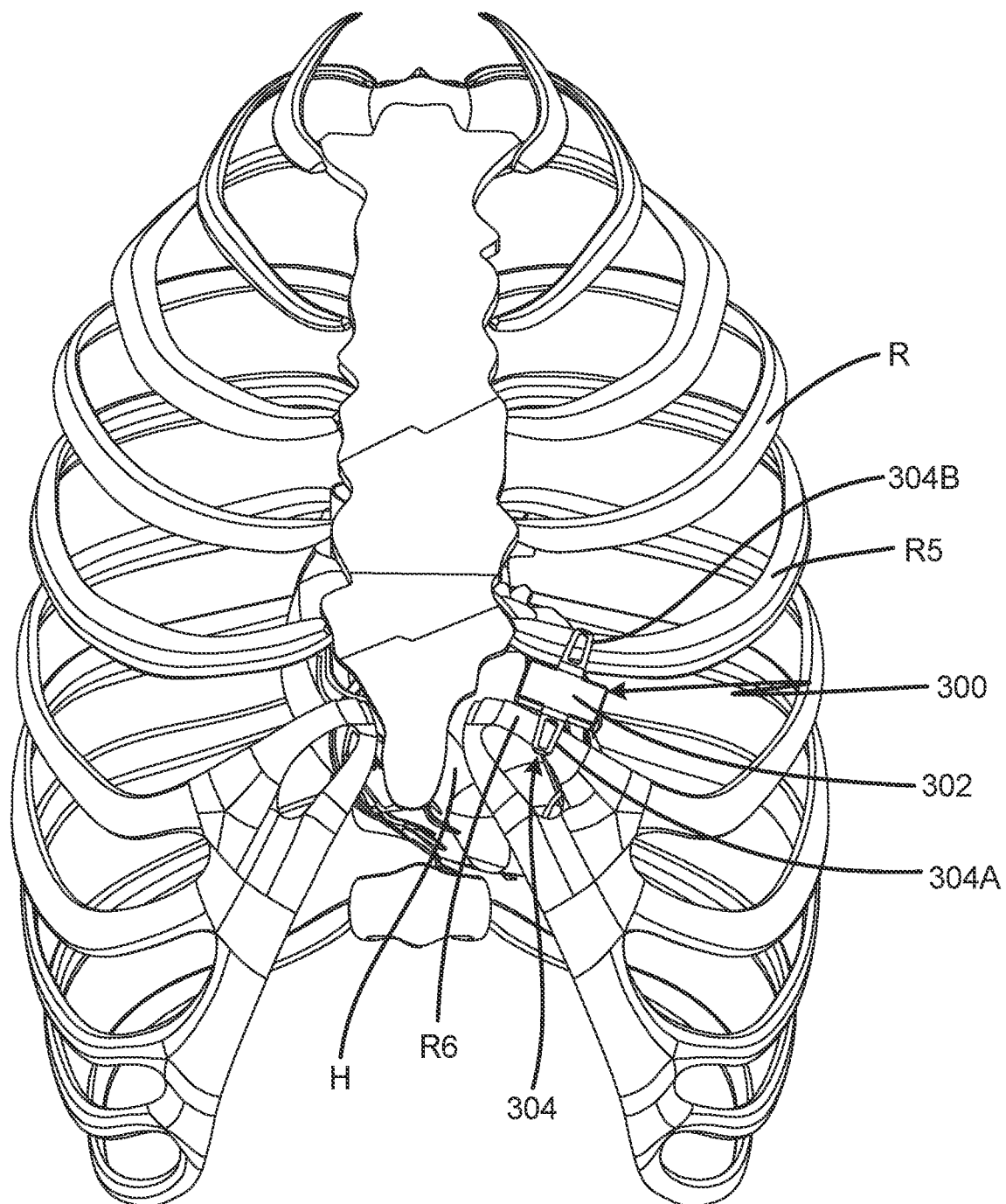

FIG. 13A front view of the second embodiment of the subcutaneous device positioned on ribs.

Figure 13B:
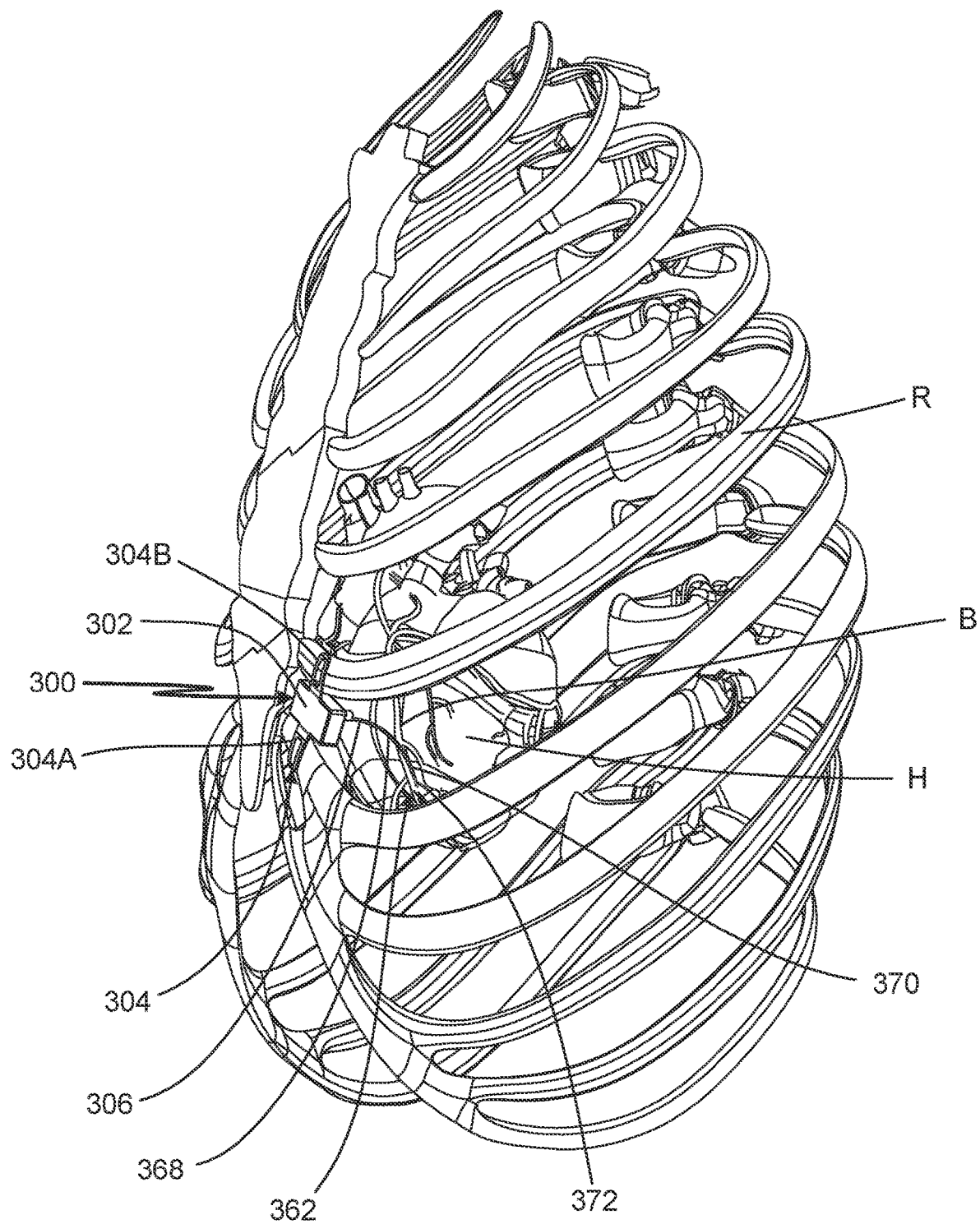

FIG. 13B is a side perspective view of the second embodiment of the subcutaneous device positioned on ribs and showing a positioning of a prong adjacent to a blood vessel.

Figure 14A:
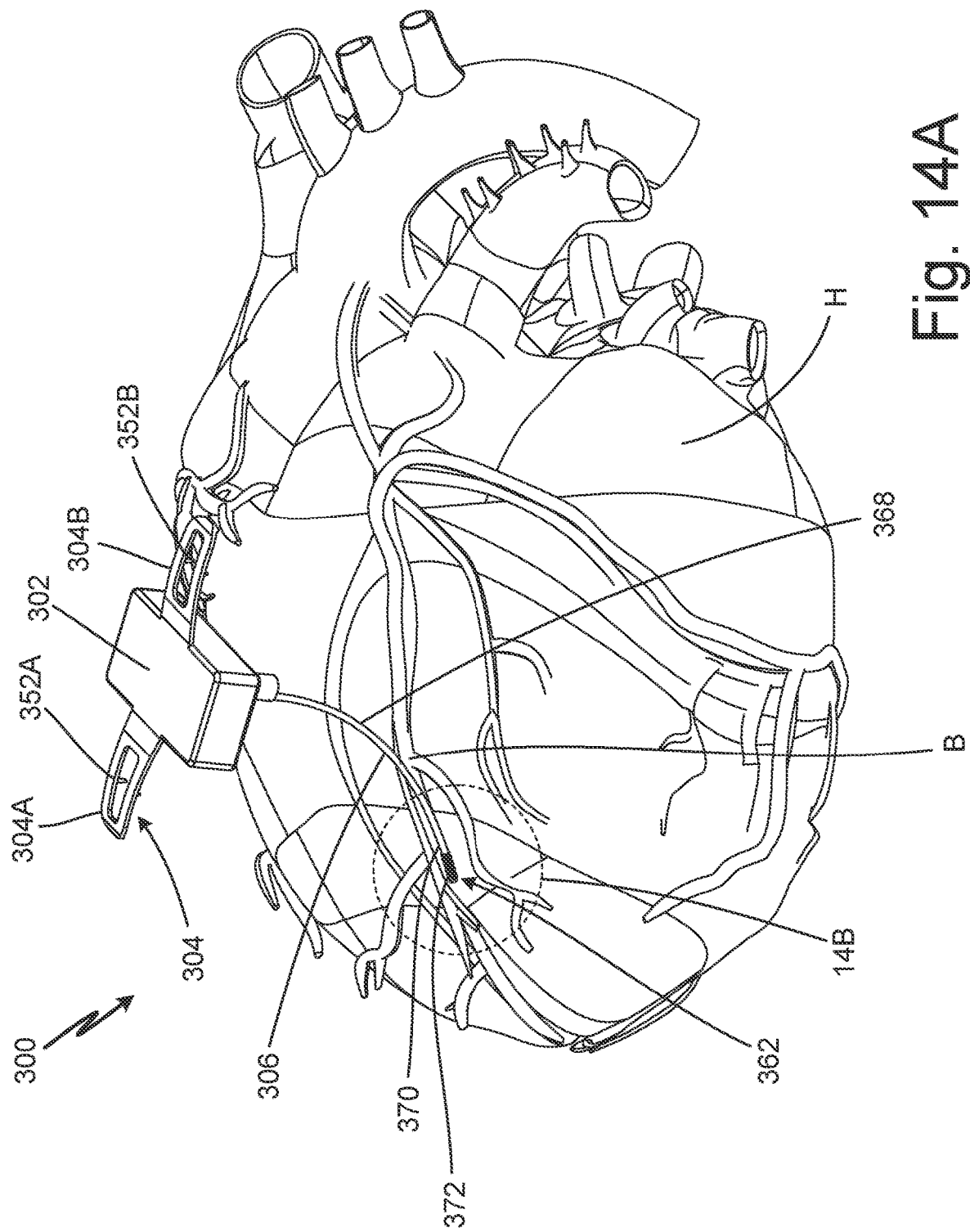

FIG. 14A is a perspective view of the second embodiment of the subcutaneous device and showing a positioning of the prong adjacent to the blood vessel.

Figure 14B:
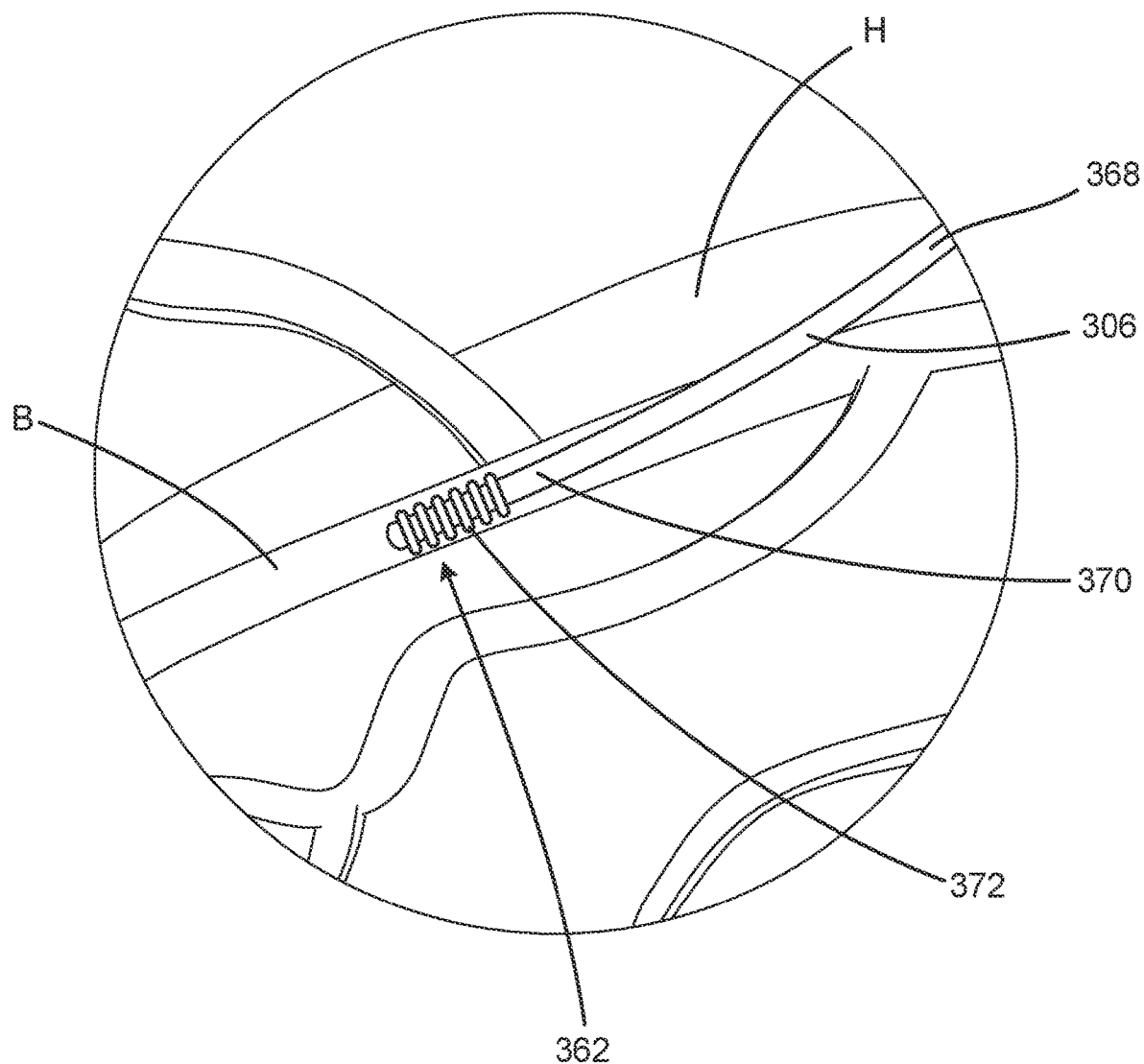

FIG. 14B is an enlarged view of the prong positioned adjacent to the blood vessel, identified by dashed circle 14B in FIG. 14A.

Subcutaneous Device 500

Figure 15:
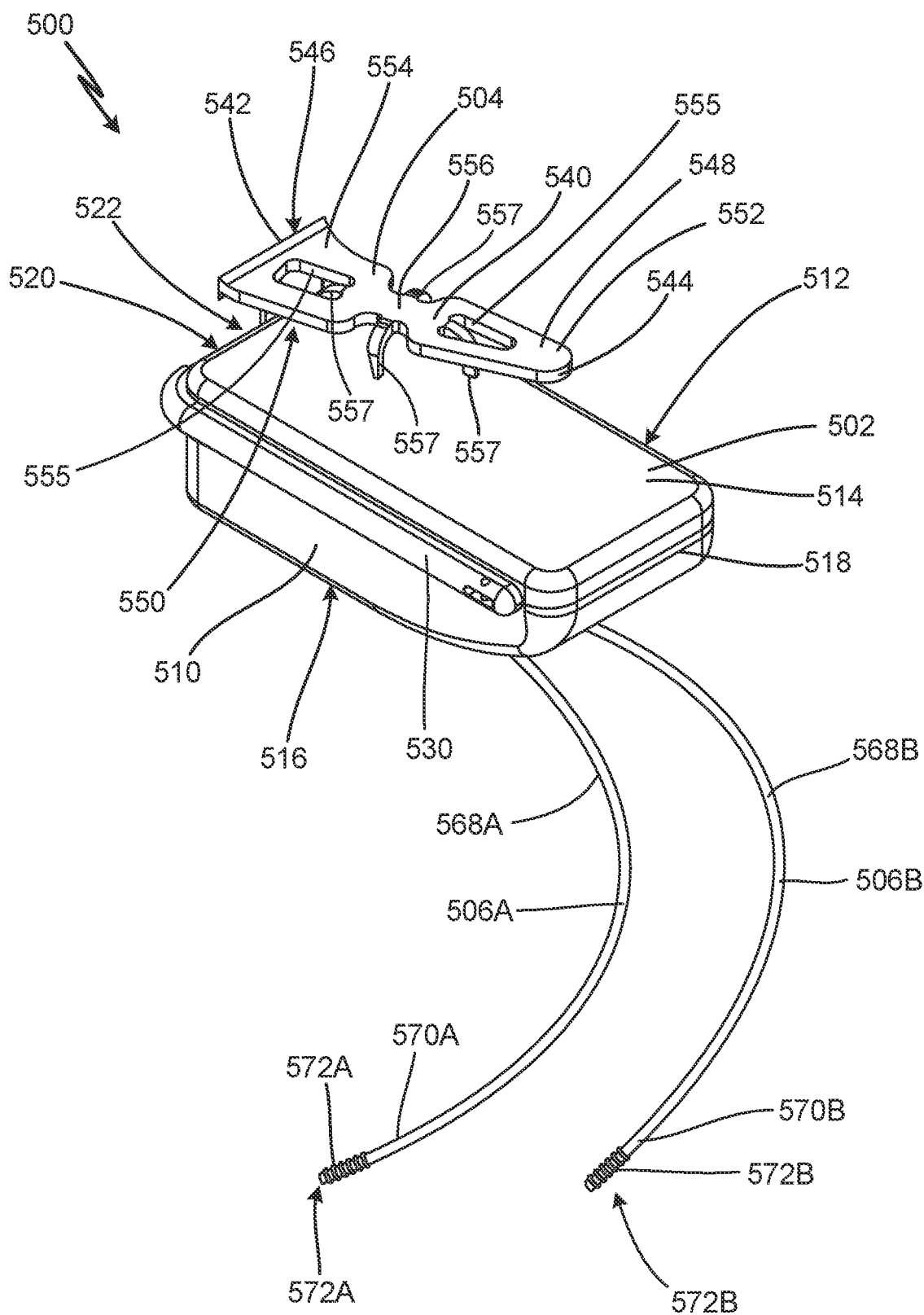

FIG. 15 is a perspective view of a third embodiment of a subcutaneous device.

Subcutaneous Device 600

Figure 16:
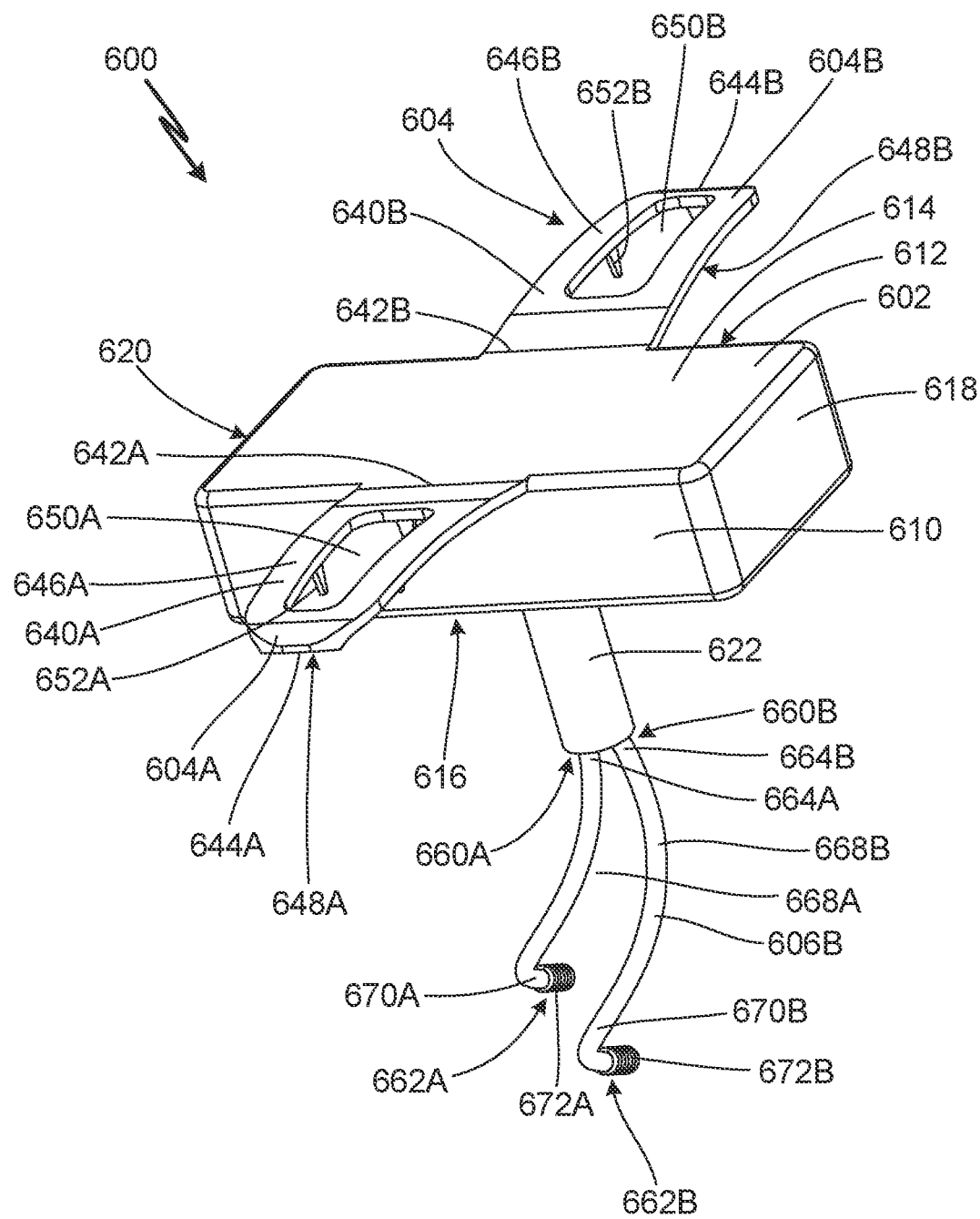

FIG. 16 is a perspective view of a fourth embodiment of a subcutaneous device.

DETAILED DESCRIPTION

In general, the present disclosure relates to a subcutaneous device that can be injected into a patient for treating atherosclerosis. The subcutaneous device includes a housing that contains the electrical circuitry of the subcutaneous device, an anchoring mechanism on the housing, and one or more prongs extending away from the housing. The anchoring mechanism is configured to anchor the subcutaneous device onto a muscle, a bone, or a tissue. The one or more prongs extend away from the housing and a distal end of the prongs are positioned adjacent to one or more blood vessels remote from the subcutaneous device. The subcutaneous device is configured to treat atherosclerosis by providing therapeutic pulsating electrical stimulation to create a pulsating electric field around blood vessels in a patient. The pulsating electrical field is configured to prevent plaque build-up in the blood vessels and/or to break up already built-up plaque in the blood vessel. The blood vessels can include veins or arteries, such as coronary arteries, carotid arteries, and peripheral arteries, in different embodiments of the subcutaneous device.

A first embodiment of the subcutaneous device described in this disclosure can be anchored to a patient's xiphoid process and/or a distal end of a patient's sternum. The xiphoid process is a process on the lower part of the sternum. At birth, the xiphoid process is a cartilaginous process. The xiphoid process ossifies over time, causing it to fuse to the sternum with a fibrous joint. The subcutaneous device can be anchored to the xiphoid process so that the housing of the subcutaneous device is positioned below the xiphoid process and sternum. In some patients, the xiphoid process is absent, small, narrow, or elongated. In such cases, the subcutaneous device can be attached directly to the distal end of the patient's sternum. When the subcutaneous device is anchored to the xiphoid process and/or sternum, the one or more prongs of the subcutaneous device extend into the mediastinum.

A second embodiment of the subcutaneous device described in this disclosure can be anchored to a patient's ribs. The subcutaneous device can be anchored to the ribs so that the housing of the subcutaneous device is positioned in an intercostal space between two ribs. When the subcutaneous device is anchored to the ribs, the one or more prongs of the subcutaneous device extend into the mediastinum.

Different embodiments of the subcutaneous device are described in detail below. The different embodiments of the subcutaneous device can include: a device with a clip attached to the housing that is used to anchor the device to a muscle, a bone, and/or a tissue, and a device with anchoring arms attached to the housing that are used to anchor the device to a muscle, a bone, and/or a tissue. These embodiments are included as examples and are not intended to be limiting. The subcutaneous device can have any suitable design and can be used for any suitable purpose in other embodiments. The features of each embodiment may be combined and/or substituted with features of any other embodiment, unless explicitly disclosed otherwise.

Subcutaneous Device 100

Figure 1:
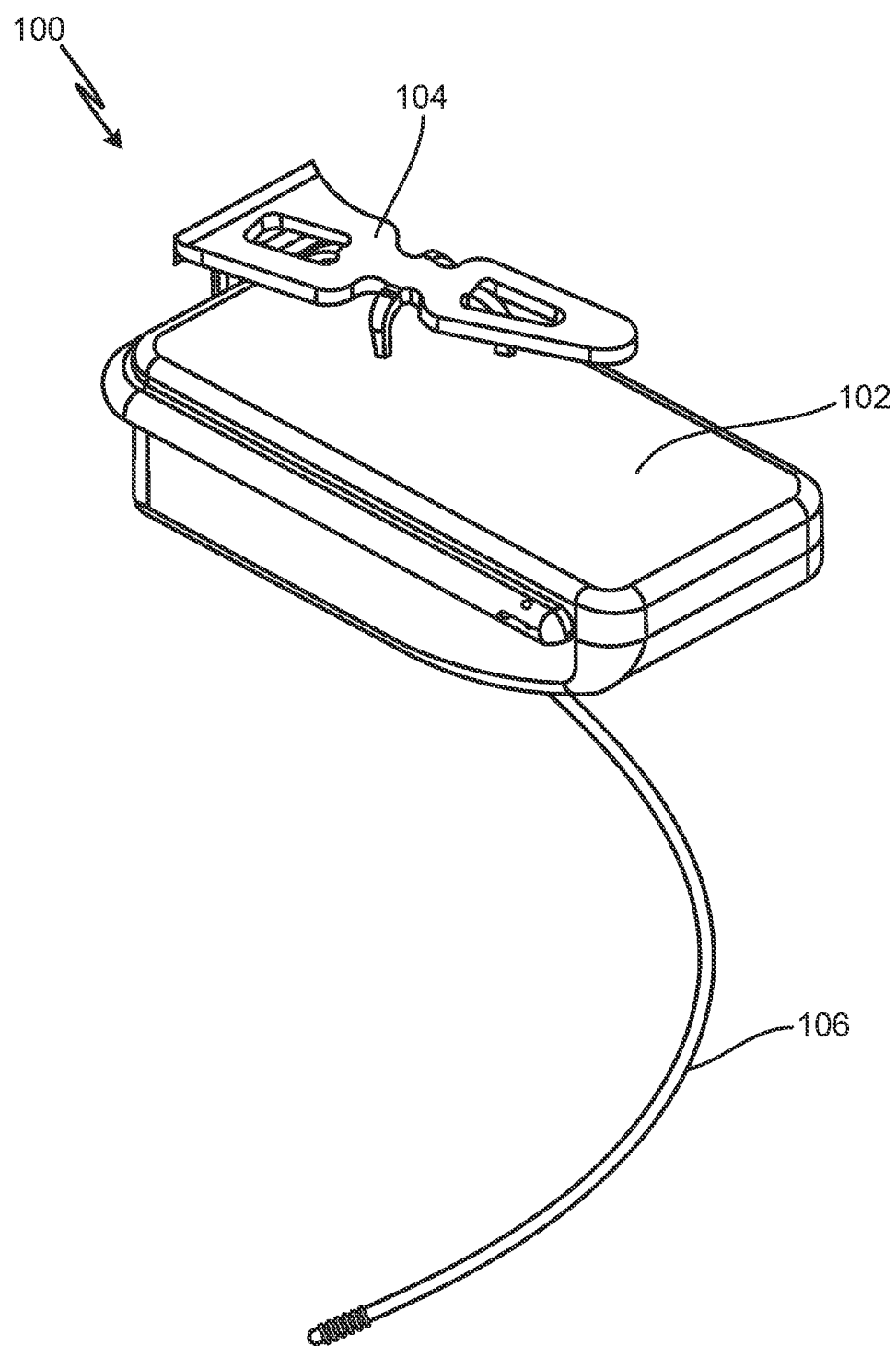
FIG. 1 is a perspective view of a first embodiment of a subcutaneous device.
Figure 2:
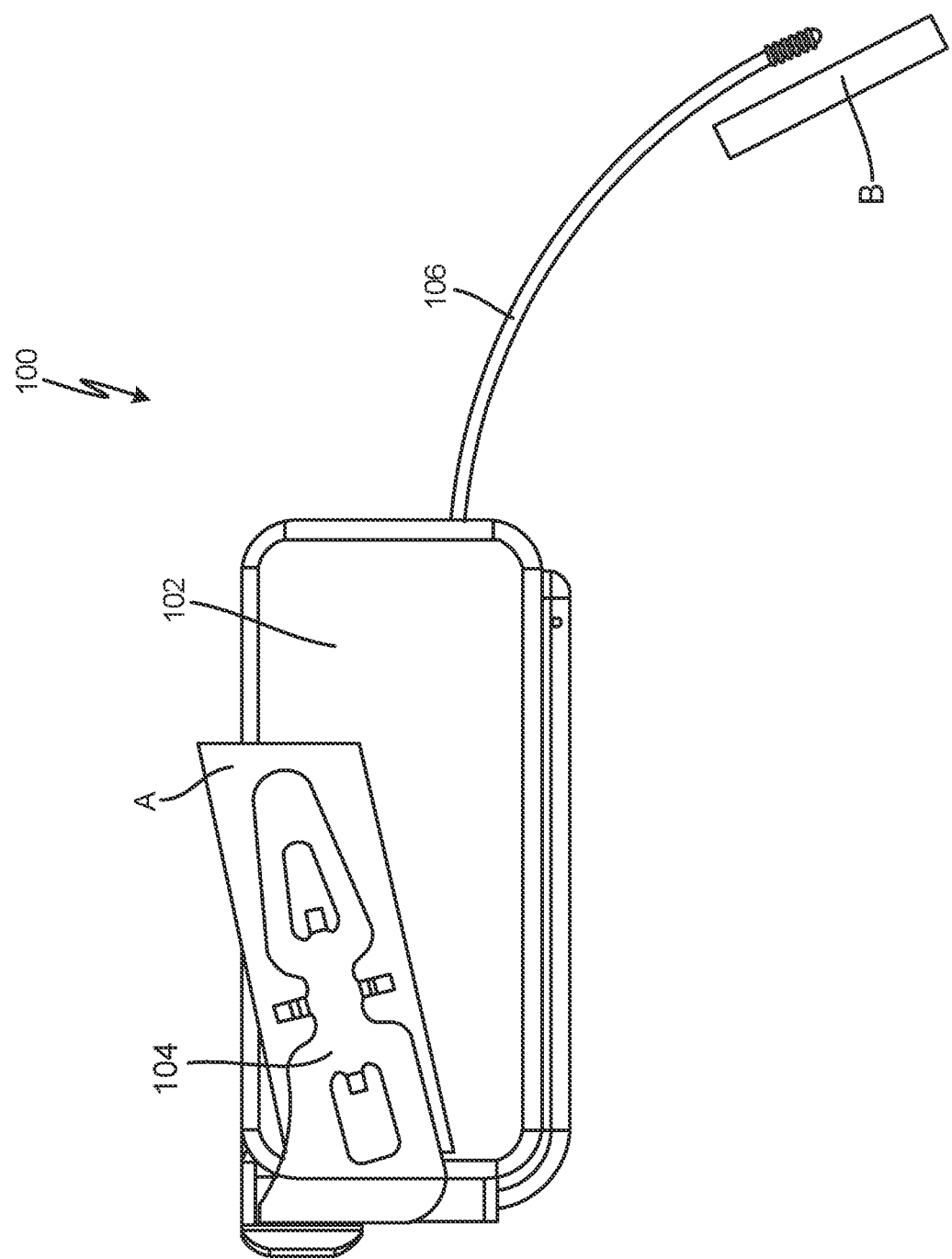
FIG. 2 is a top view of the first embodiment of the subcutaneous device anchored to a structural body component.

FIG. 1 is a perspective view of subcutaneous device 100. FIG. 2 is a top view of subcutaneous device 100 anchored to structural body component A. Subcutaneous device 100 includes housing 102, clip 104, and prong 106. FIG. 2 shows structural body component A and blood vessel B.

Subcutaneous device 100 is a medical device that is configured to be anchored to structural body component A. Structural body component A may be a muscle, a bone, or a tissue of a patient. Subcutaneous device 100 is a subcutaneous device for treating atherosclerosis. Specifically, subcutaneous device 100 can provide therapeutic pulsating electrical stimulation to create a pulsating electric field around blood vessel B to treat atherosclerosis. Blood vessel B can be an artery or a vein in a patient. Subcutaneous device 100 can provide a pulsating electrical stimulation to create a pulsating electric field around blood vessel B to prevent plaque build-up and break up plaque already built-up in blood vessel B. The pulsating electric field created around blood vessel B may also prevent plaque build-up and break up plaque already built-up in other blood vessels near blood vessel B. Subcutaneous device 100 includes housing 102. Housing 102 can contain a power source, a controller, a memory, a transceiver, therapeutic circuitry, and/or any other component of a medical device.

Clip 104 is attached to housing 102. Clip 104 is an anchoring mechanism that is configured to anchor subcutaneous device 100 to structural body component A. Clip 104 can be a passive clip or an active clip. A passive clip only uses the stiffness of clamping components to attach to the bone, the muscle, or the tissue. This stiffness can be the result of design or active crimping during the implant procedure. An active clip may additionally use an active fixation method such as sutures, tines, pins, or screws to secure the clip to the bone, the muscle, or the tissue. In the embodiment shown in FIG. 1-2, clip 104 moves vertically within housing 102 between an open position and a closed position. Clip 104 is moved vertically away from housing 102 when clip 104 is in an open position. Clip 104 will be in an open position as it is advanced around structural body component A. Clip 104 is moved vertically toward housing 102 to change clip 104 from an open position to a closed position. Clip 104 is shown in FIG. 2 in a closed position around structural body component A to clamp around structural body component A and anchor subcutaneous device 100 to structural body component A. Clip 104 is an active clip. In addition to using the stiffness of clamping components to attach to the bone, the muscle, and/or the tissue, clip 104 uses an active fixation method, such as sutures, tines, pins, screws, and/or any other suitable anchoring structure, to secure clip 104 to the bone, the muscle, or the tissue.

Prong 106 is connected to and extends away from housing 102 of subcutaneous device 100. Prong 106 is configured to be positioned adjacent to blood vessel B that is positioned away from structural body component A. Prong 106 includes one or more electrodes that are capable of providing therapeutic pulsating electrical stimulation to create a pulsating electric field around blood vessel B. A controller in housing 102 of subcutaneous device 100 can send instructions to therapeutic circuitry to provide therapeutic pulsating electrical stimulation to create a pulsating electric field around blood vessel B using the one or more electrodes on prong 106 of subcutaneous device 100.

Subcutaneous device 100 will be discussed in greater detail in relation to FIGS. 3A-8B below.

Figure 3A:
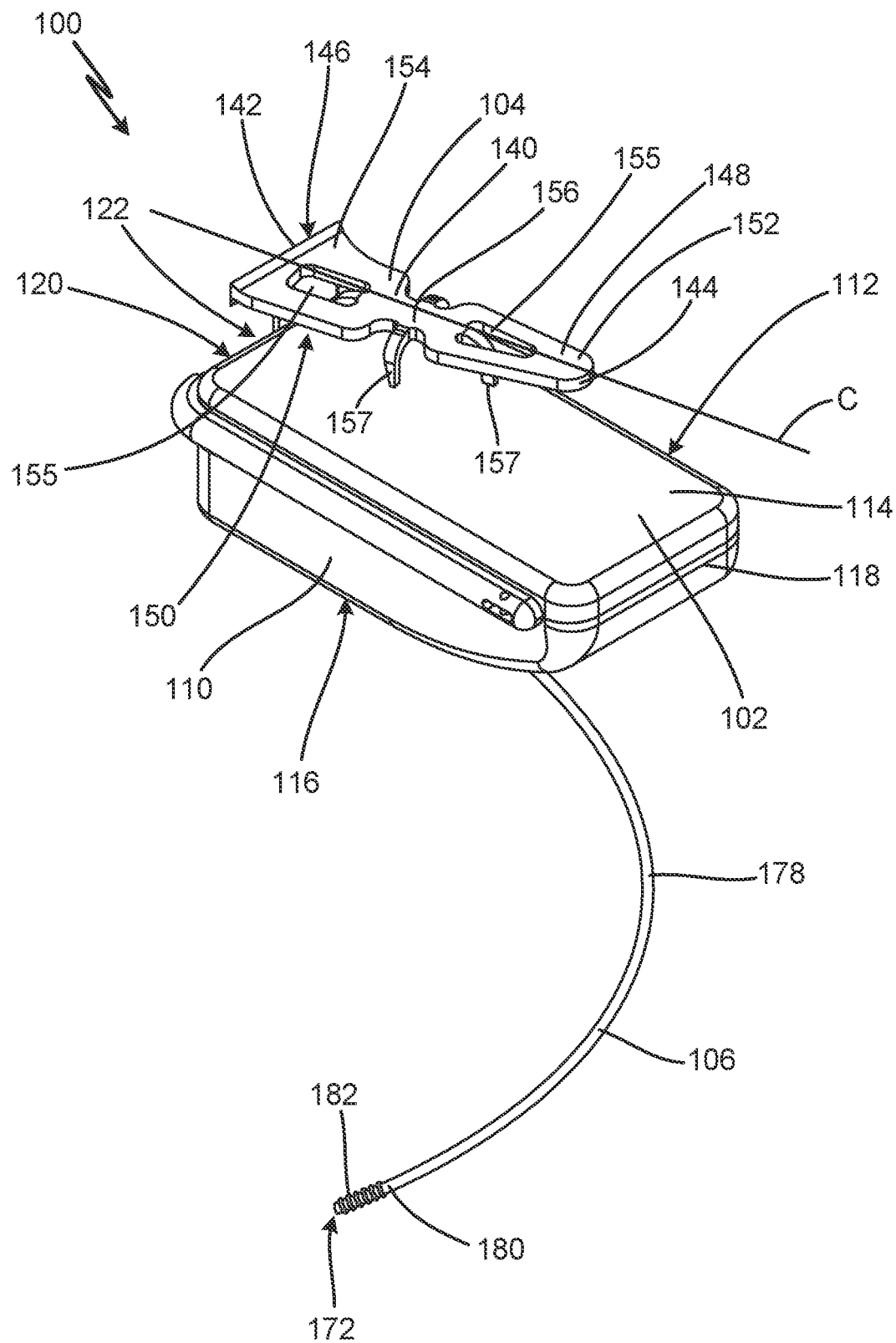
FIG. 3A is a top perspective view of the first embodiment of the subcutaneous device.
Figure 3B:
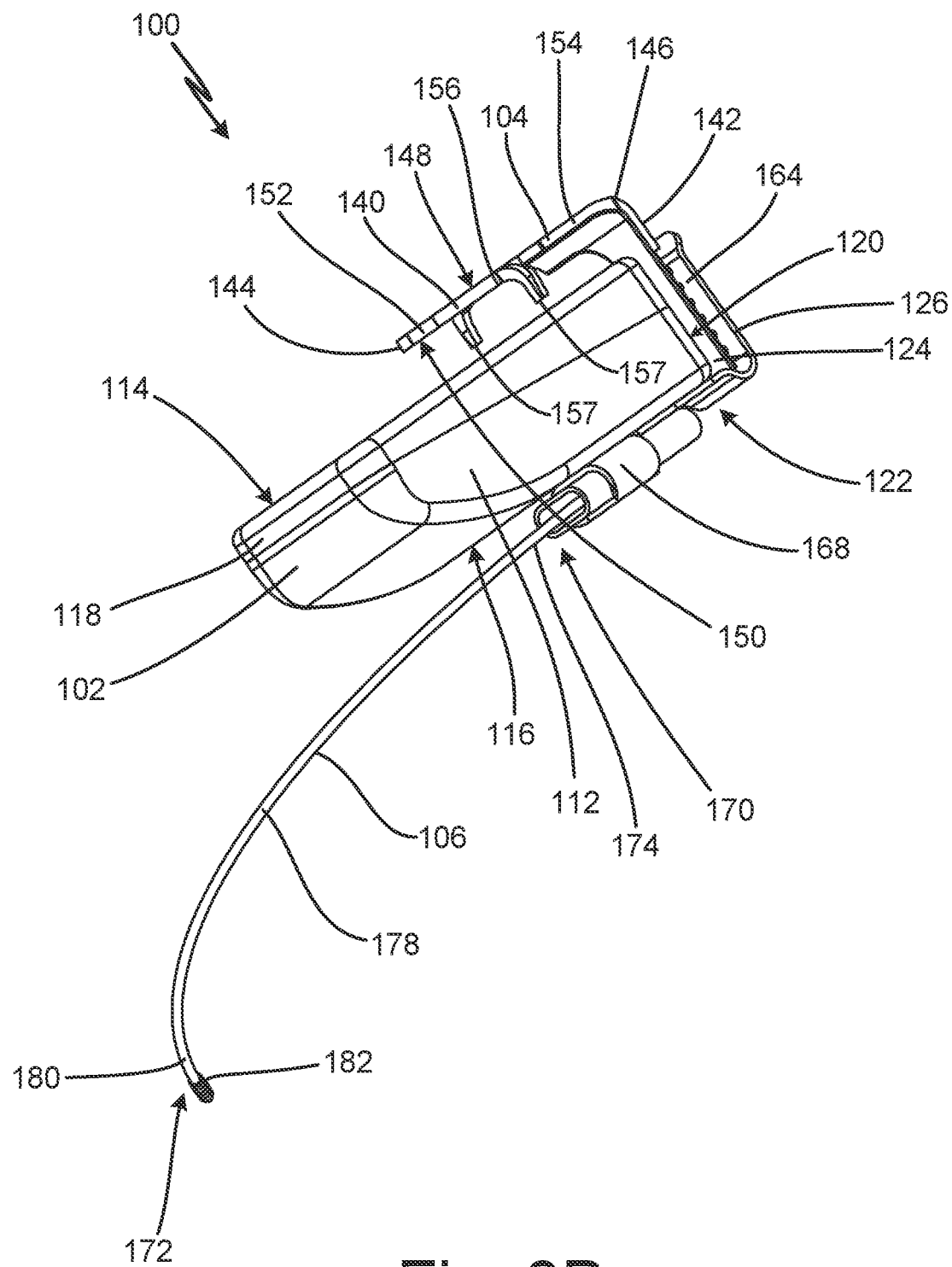
FIG. 3B is a side perspective view of the first embodiment of the subcutaneous device.
Figure 3C:
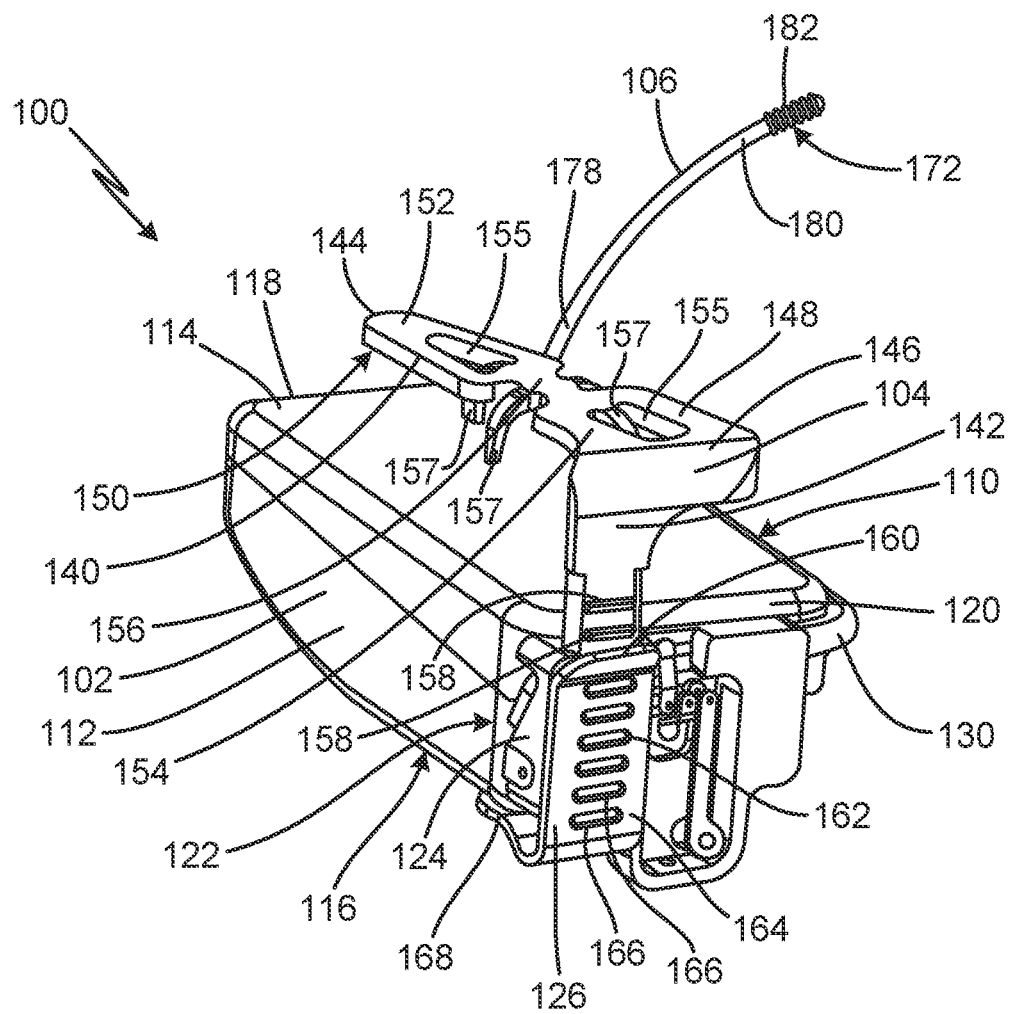
FIG. 3C is a back perspective view of the first embodiment of the subcutaneous device.
Figure 3D:
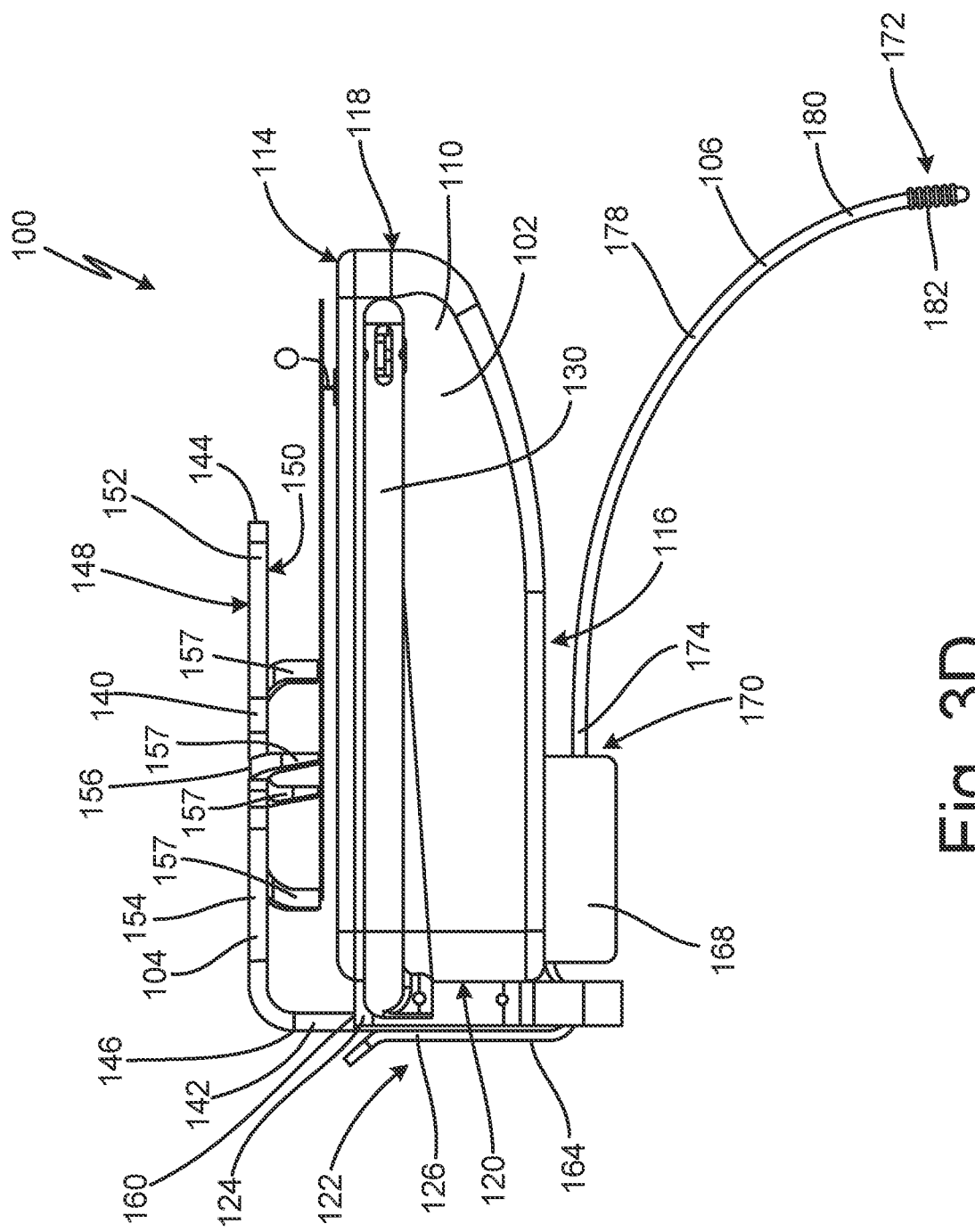
FIG. 3D is a side view of the first embodiment of the subcutaneous device.
Figure 4:
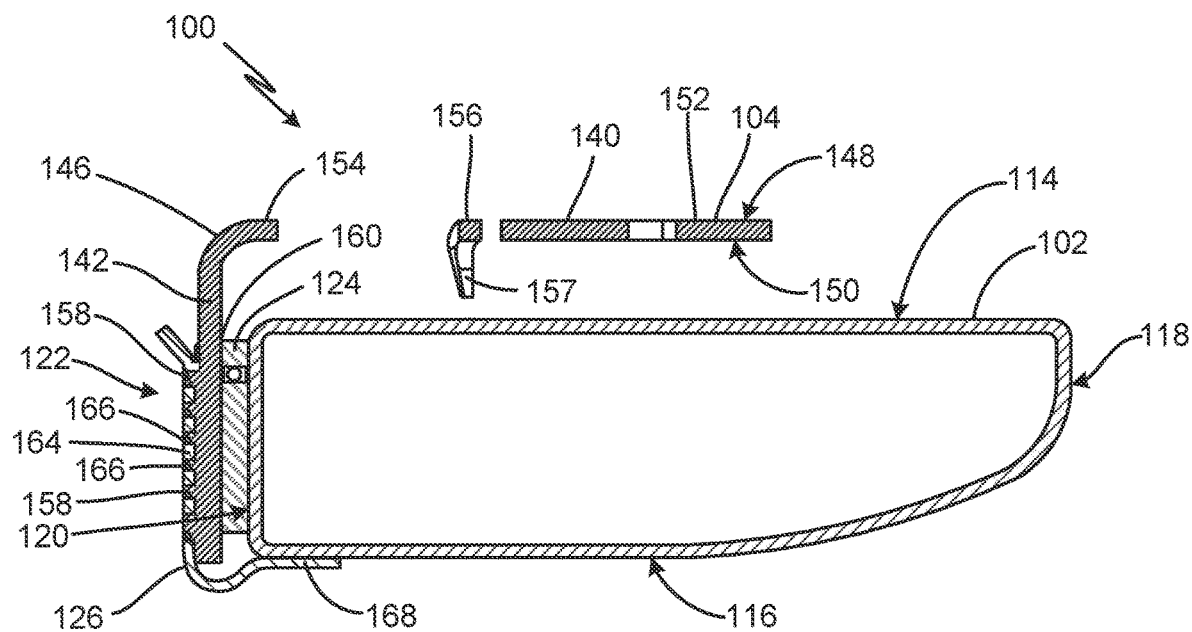
FIG. 4 is a cross-sectional side view of a housing and a clip of the first embodiment of the subcutaneous device.
Figure 5:
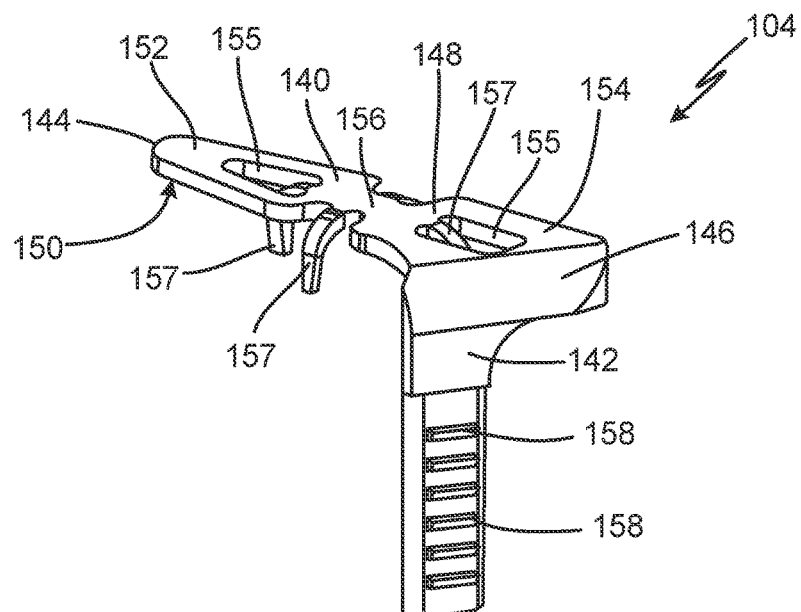
FIG. 5 is a back perspective view of the clip of the first embodiment of the subcutaneous device.

FIG. 3A is a top perspective view of subcutaneous device 100. FIG. 3B is a side perspective view of subcutaneous device 100. FIG. 3C is a back perspective view of subcutaneous device 100. FIG. 3D is a side view of subcutaneous device 100. FIG. 4 is a cross-sectional side view of housing 102 and clip 104 of subcutaneous device 100. FIG. 5 is a back perspective view of clip 104 of subcutaneous device 100. Subcutaneous device 100 includes housing 102, clip 104, and prong 106. Housing 102 includes first side 110, second side 112, top side 114, bottom side 116, front end 118, back end 120, receiving portion 122 (which has body 124 and coupler 126), and guide 130. Clip 104 includes anchoring portion 140, mast portion 142, front end 144, back end 146, top side 148, bottom side 150, front portion 152, back portion 154, openings 155, center portion 156, tines 157, and pins 158. Body 124 of receiving portion 122 includes opening 160 and window 162. Coupler 126 of receiving portion 122 includes mating portion 164 having slots 166 and bottom portion 168. Prong 106 includes proximal end 170, distal end 172, base portion 174, arm portion 178, therapeutic portion 180, and electrode 182. FIG. 3A also shows axis C. FIG. 3D also shows opening O.

Subcutaneous device 100 includes housing 102, clip 104, and prong 106 as described in reference to FIGS. 1-2. Housing 102 includes first side 110, second side 112, top side 114, bottom side 116, front end 118, and back end 120. First side 110 is opposite of second side 112; top side 114 is opposite of bottom side 116; and front end 118 is opposite of back end 120. Housing 102 is substantially rectangular-shaped in the embodiment shown. In alternate embodiments, housing 102 can be shaped as a cone, frustum, or cylinder. Housing 102 can be made out of stainless steel, titanium, nitinol, epoxy, silicone, polyurethane with metallic reinforcements, or any other material that is suitable for non-porous implants. Housing 102 can also include an exterior coating.

Receiving portion 122 of housing 102 is connected to back end 120 of housing. Receiving portion 122 has rectangular-like body 124 and coupler 126. A front end of body 124 is connected to back end 120 of housing 102. Coupler 126 is connected to clip 104 through body 124. Guide 130 is an L-shaped rod that is connected to back end 120 and first side 110 of housing 102. In the embodiment shown in FIGS. 3A-3D, guide 130 is closer to top side 114 than bottom side 116 of housing 102. Guide 130 is configured to guide housing 102 of subcutaneous device 100 through a surgical instrument used to implant subcutaneous device 100 into a patient.

Clip 104 has anchoring portion 140 connected to mast portion 142. Anchoring portion 140 forms a top of clip 104 and extends across top side 114 of housing 102. Mast portion 142 forms a bottom of clip 104 and is a flat portion configured to fit within body 124 of receiving portion 122. Clip 104 can be made out of stainless steel, titanium, nitinol, epoxy, silicone, polyurethane with metallic reinforcements, or any other material that is suitable for non-porous implants.

Anchoring portion 140 of clip 104 extends from front end 144 to back end 146. Front end 144 is opposite back end 146. Front end 144 forms a tip of clip 140. Mast portion 142 is connected to anchoring portion 140 at back end 146. Anchoring portion 140 has top side 148 opposite bottom side 150. Top side 148 and bottom side 150 are flat portions of clip 104. Anchoring portion 140 has front portion 152 extending from front end 144 and back portion 154 extending from back end 146. Front portion 152 is narrower than back portion 154. In this embodiment, front portion 152 and back portion 154 each have an opening 155 extending therethrough from top side 148 to bottom side 150. Openings 155 are configured to allow clip 104 to be sutured to a muscle, a bone, or a tissue in a patient to secure subcutaneous device 100 to the muscle, the bone, or the tissue. Further, openings 155 can receive additional fixation mechanisms, such as tines, pins, or screws, to secure subcutaneous device 100 to the muscle, the bone, or the tissue. These additional fixation mechanisms can be made from bioabsorbable materials. In alternate embodiments, any number of openings 155 may extend through front portion 152 and/or back portion 154. Front portion 152 is connected to back portion 154 via center portion 156, which is connected to and between front portion 152 and back portion 154. Front portion 152 tapers toward front end 144, and back portion 154 tapers toward center portion 156. In this embodiment, center portion 156 is narrower than front portion 152 and back portion 154. In alternate embodiments, center portion 156 may only be narrower than front portion 152. The taper and size of front portion 152 may help clip 104 push through tissue when clip 104 is being anchored to structural body component A, as shown and discussed in FIG. 2, such as a muscle, a bone, or a tissue of a patient.

In the embodiment shown in FIGS. 3A-5, tines 157 extend from anchoring portion 140. Tines 157 have first ends connected to center portion 156 of anchoring portion 140 and second ends that extend away from bottom side 150 of clip toward top side 114 of housing 102. In alternate embodiments, tines 157 may have first ends connected to any suitable portion of anchoring portion 140. Tines 157 are curved. Tines 157 are thin and may be made of metal or any other suitable material. In this embodiment, clip 104 has four tines 157. In alternate embodiments, clip 104 may have any number of tines 157. Further, in alternate embodiments, any other suitable anchoring structures or active fixation methods may be used along with or instead of tines 157. Tines 157 extend in different directions. In this embodiment, a first tine 157 extends at 0 degrees, a second tine 157 extends at 90 degrees, a third tine 157 extends at 180 degrees, and a fourth tine 157 extends at 270 degrees. In alternate embodiments, tines 157 may extend from anchoring portion 140 at any angle. Tines 157 are configured to pierce and anchor to structural body component A, as seen in FIG. 2.

Mast portion 142 of clip 104 is connected to anchoring portion 140 of clip 104 at back end 146. Mast portion 142 of clip 104 has pins 158 extending from a back end of mast portion 142. Pins 158 are slightly curved and spaced from each other along mast portion 142. Pins 158 of clip 104 are configured to engage coupler 126 of receiving portion 122. Mast portion 142 of clip 104 is attached to housing 102 of subcutaneous device 100 via pins 158.

A front end of body 124 of receiving portion 122 is connected to back end 120 of housing 102. Body 124 of receiving portion 122 has rectangular opening 160 extending from a top of body 124 to a bottom of body 124. Rectangular opening 160 is configured to accept mast portion 142 of clip 104. Window 162 of body 124 is an opening in back end of body 124. Coupler 126 of receiving portion 122 is connected to clip 104 through window 162 of body 124. Coupler 126 extends beyond a top end and a bottom end of window 162. Coupler 126 has mating portion 164, which includes slots 166, and bottom portion 168. Mating portion 164 of coupler 126 is connected to mast portion 142 of clip 104 through window 162 of body 126. Slots 158 are rectangular openings extending through mating portion 164 of coupler 126 from a front end to a back end of mating portion 164. Slots 166 are spaced from each other along mating portion 164 of coupler 126. Slots 166 are configured to accept pins 158. Pins 158 on mast portion 142 of clip 104 engage with slots 166 in mating portion 164 of coupler 126. Bottom portion 168 of coupler 126 is connected to mating portion 164 of coupler 126. Bottom portion 168 of coupler 126 extends around a bottom of body 124 and along bottom side 116 of housing 102. Bottom portion 168 of coupler 126 has a curved portion configured to accept prong 106.

Clip 104 is connected to receiving portion 122 of housing 102 via coupler 126. Mast portion 142 of clip 104 is inserted into opening 160 of body 124 of receiving portion 122. At least one pin 158 of mast portion 142 of clip 104 extends from opening 160 of body 124 toward window 162. At least one pin 158 of clip 104 engages a slot 166 in mating portion 164 of coupler 126 of receiving portion 122 to secure coupler 126 of receiving portion 122 to clip 104, which secures coupler 126 of receiving portion 122 and clip 104 to body 124 of receiving portion 122 of housing 102. Mating portion 164 extends beyond the top end and the bottom end of window 162 to contact body 124. As such, receiving portion 122 connects clip 104 to housing 122 via a ratchet mechanism using pins 158 and slots 166. Mast portion 142 of clip 104 is within opening 160 of body 124. Coupler 126 is connected to clip 104 and body 124 of receiving portion 122.

When clip 104 is connected to housing 102, anchoring portion 140 of clip 104 extends along top side 114 of housing 102. Anchoring portion 140 of clip 104 extends at an angle to the length of housing 102 from back end 120 to front end 118. As shown in FIG. 3A, anchoring portion 140 of clip 104 is configured to extend along axis C, which may be the central axis of the sternum of a patient when subcutaneous device 100 is inserted into a patient. Housing 102 extends from back end 120 to front end 118 at an angle greater than 0 degrees to axis C, such as at about 15 degrees from axis C. Housing 102 may extend at other angles to axis C based on the location of the blood vessel and the shape and size of prong 106 positioned adjacent the blood vessel. For example, housing 102 may extend between about 20 and 30 degrees from axis C, preferably 25 degrees from axis C, to reach blood vessels positioned adjacent the right ventricle of the heart or between about 45 and 60 degrees from axis C to reach blood vessels positioned adjacent the left ventricle of the heart. As such, housing 102 may extend from back end 120 to front end 118 at an angle of at least about 15 degrees from axis C. Further, in alternate embodiments, housing 102 may extend from back end 120 to front end 118 at 0 degrees to axis C, such that anchoring portion 140 of clip 104 is aligned with, or parallel to, housing 102. While anchoring portion 140 of clip 104 is angled with respect to housing 102, anchoring portion 140 of clip 104 remains within a width of housing 102. As such, anchoring portion 140 of clip 104 is between first side 110 and second side 112 of housing 102.

Opening O is formed between anchoring portion 140 of clip 104 and top side 114 of housing 102. Specifically, opening O is between second, or bottom, ends of tines 157 of clip 104 and top side 114 of housing 102. Clip 104 is movable within receiving portion 122 between an open position and a closed position to change the height of opening O. As seen in FIG. 3C, clip 104 is in an open position. When clip 104 is in an open position, opening O is expanded and has an increased height. Pins 158 of mast portion 142 of clip 104 are engaged with slots 166 near a top end of mating portion 164 of coupler 126. Mating portion 164 of coupler 126 contacts body 124 of receiving portion 122. A space is between the bottom end of mast portion 142 of clip 104 and the bottom end of body 124 of receiving portion 122. Clip 104 is in an open position when subcutaneous device 100 is inserted into a patient. Opening O is positioned around the muscle, the bone, or the tissue. Because opening O is increased, or enlarged, subcutaneous device 100 slides easily onto the muscle, the bone, or the tissue without experiencing significant resistance.

When subcutaneous device 100 is positioned on the muscle, the bone, or the tissue, clip 104 is moved into a closed position, as shown in FIG. 3D. When clip 104 is in a closed position, opening O is reduced and has a decreased height. Mast portion 142 of clip 104 is advanced farther into opening 160 of body 124 of receiving portion 122 to move clip 104 into a closed position. As bottom end of mast portion 142 of clip 104 moves closer to bottom end of body 124 of receiving portion 122, pins 158 move from slots 166 near a top end of mating portion 164 to slots 166 near a bottom end of mating portion 164. As such, pins 158 that were not in contact with mating portion 164 will become engaged with slots 166 near a top end of mating portion 164 so that more slots 166 of mating portion 164 receive a pin 158. Alternate embodiments may include any number of pins 158 and corresponding slots 166. As such, anchoring portion 140 of clip is forced toward top side 114 of housing 102 and down onto the muscle, the bone, or the tissue, reducing the height of opening O. Mast portion 142 of clip 104 is advanced farther into body 124 of receiving portion 122 until pins 158 reaches slots 166 that position anchoring portion 140 of clip 104 close enough to top side 114 of housing 102 that tines 157 attach to the muscle, the bone, or the tissue, anchoring clip 104 to structural body component A, the muscle, the bone, or the tissue, as seen in FIG. 2. Tines 157 will pierce the muscle, the bone, or the tissue in response to the pressure from pin 158 engaged with slot 166. Opening O may be reduced such that tines 157 contact top side 114 of housing 102, which causes tines 157 to bend back around into the muscle, the bone, or the tissue, further securing and anchoring clip 104 and subcutaneous device 100 to the muscle, the bone, or the tissue. Prong 106 connected to and extending away from housing 102 will be positioned adjacent to blood vessel B when housing 102 is anchored to structural body component A.

Tines 157 are also removable from the muscle, the bone, or the tissue such that subcutaneous device 100 is easily removable. The thin metal, or other suitable material, of tines 157 enables tines 157 to maintain flexibility. To remove clip 104 from structural body component A, mating portion 164 of coupler 126 is pulled away from body 124 of receiving portion 122 and clip 104, disengaging pins 158 from slots 166. Mast portion 142 of clip 104 is moved out of opening 160 of body 124 of receiving portion 122. Mating portion 164 can be released, and pins 158 can reengage slots 166 near the top end of mating portion 164 of clip 104. Pressure on anchoring portion 140 of clip 104 is reduced as anchoring portion 140 is moved away from top side 114 of housing 102, enlarging opening O and moving clip 104 into an open position. Subcutaneous device 100 can then be removed from the muscle, the bone, or the tissue and pulled out and removed from the body of the patient. Additional instruments, such as a scalpel or a cautery instrument may be used to assist in removal of subcutaneous device 100 from the muscle, the bone, or the tissue.

Prong 106 includes proximal end 170 and distal end 172 that is opposite of proximal end 170. Proximal end 170 of prong 106 may have strain relief or additional material to support movement. Prong 106 includes base portion 174, arm portion 178, and therapeutic portion 180. A first end of base portion 174 is aligned with proximal end 170 of prong 106, and a second end of base portion 174 is connected to a first end of arm portion 178. Base portion 174 is a straight portion that is positioned against and extends along bottom side 116 of housing 102. Base portion 174 is attached to housing 102. Bottom portion 168 of coupler 126 extends around base portion 174 of prong 106 to secure base portion 174 of prong 106 to housing 102. Base portion 174 extends through bottom portion 168 of coupler 126. As such, proximal end 170 of prong 106 is attached to housing 102. Base portion 174 of prong 106 is electrically connected to the internal components of housing 102, for example with a feedthrough, to which prong 106 is also connected. Base portion 174 of prong 106 is hermetically sealed in housing 102.

The first end of arm portion 178 is connected to the second end of base portion 174, and a second end of arm portion 178 is connected to a first end of therapeutic portion 180. Arm portion 178 is a curved portion that connects base portion 174 to therapeutic portion 180. Arm portion 178 also extends past front end 118 of housing 102 so that therapeutic portion 180 is positioned outwards from front end 118 of housing 102. In this embodiment, arm portion 178 is a curved portion that extends away from housing 102 in a first direction. In alternate embodiments, arm portion 178 can be straight or curved and extend in any direction to reach any blood vessel B.

The first end of therapeutic portion 180 is connected to the second end of arm portion 178, and a second end of therapeutic portion 180 is aligned with distal end 172 of prong 106. Arm portion 178 extends beyond front end 118 of housing 102 so that therapeutic portion 180 is positioned beyond front end 118 of housing 102. Therapeutic portion 180 can be positioned adjacent to blood vessel B.

Prong 106 further includes electrode 182. Electrode 182 is shown as being a coil electrode on distal end 172 in the embodiment shown in FIGS. 3A-3D. In alternate embodiments, electrode 182 can be positioned at any point on therapeutic portion 180 and can have any shape and configuration. Further, prong 106 is shown as having a single electrode 182 in the embodiment shown in FIGS. 3A-3D. Prong 106 can have any number of electrodes in alternate embodiments. Electrode 182 is positioned on distal end 172 of prong 106 to provide therapeutic pulsating electrical stimulation to create a pulsating electric field around blood vessel B and other blood vessels near blood vessel B.

Prong 106 is made of a stiff material so that it is capable of pushing through tissue in the body when subcutaneous device 100 in implanted into a patient. Prong 106 can be made out of nickel titanium, also known as Nitinol. Nitinol is a shape memory alloy with superelasticity, allowing prong 106 to go back to its original shape and position if prong 106 is deformed as subcutaneous device 100 is implanted into a patient. Prong 106 can also be made out of silicone, polyurethane, stainless steel, titanium, epoxy, polyurethane with metallic reinforcements, or any other material that is suitable for non-porous implants. As an example, prong 106 can be made out of a composite made of polyurethane and silicone and reinforced with metal to provide spring stiffness.

Distal end 172 of prong 106 has a rounded shape to prevent prong 106 from puncturing or damaging blood vessel B or other blood vessels, organs, or tissue surrounding blood vessel B, such as the pericardium, heart, or lungs, when therapeutic portion 180 of prong 106 is positioned adjacent to blood vessel B. The overall axial stiffness of prong 106 can be adjusted so that prong 106 can move up, down, and side-to-side in a body of the patient as the patient moves and as a patient's heart beats, but is not stiff or sharp enough to pierce or tear blood vessel B or other blood vessels, organs, or tissue surrounding blood vessel B.

Subcutaneous device 100 is described here as having a single prong 106. In alternate embodiments, subcutaneous device 100 can include any number of prongs and those prongs can have any shape.

Clip 104 includes tines 157 that attach to structural body component A to sufficiently anchor subcutaneous device 100 to structural body component A, ensuring proper alignment of subcutaneous device 100 with respect to structural body component A and blood vessel B. Tines 157 and pins 158 within receiving portion 122 also allow for the removal of subcutaneous device 100 from structural body component A. Opening O between housing 102 and clip 104 of subcutaneous device 100 is adjustable via the ratchet mechanism formed by pins 158 of clip 104 and slots 166 of receiving portion 122 to enable easy insertion and removal of subcutaneous device 100. Thus, subcutaneous device 100 can be both securely implanted and easily removed for repair or replacement using less traumatic insertion and removal processes than a traditional device.

Clip 104 is shown as having a first structure and design in FIGS. 1-5. Clip 104 can alternatively have the structure and design as any of the clips shown in and described in U.S. application Ser. No. 17/020,356, filed on Sep. 14, 2020, and entitled "Clip Design for a Subcutaneous Device," the disclosure of which is incorporated by reference in its entirety.

Prong 106 includes electrode 182 on distal end 172 that is configured to be positioned adjacent to blood vessel B. Therapeutic circuitry in housing 102 can be electrically coupled to electrode 182 on prong 106. The therapeutic circuitry is configured to provide pulsating electrical stimulation to create a pulsating electric field around blood vessel B to prevent plaque build-up and/or to break up already built-up plaque in blood vessel B or other blood vessels near blood vessel B in the pulsating electric field. As such, subcutaneous device 100 is configured to prevent and treat atherosclerosis. The pulsating electrical stimulation and pulsating electric field provided by the therapeutic circuitry will be discussed in greater detail with respect to FIG. 6 below.

Figure 6:
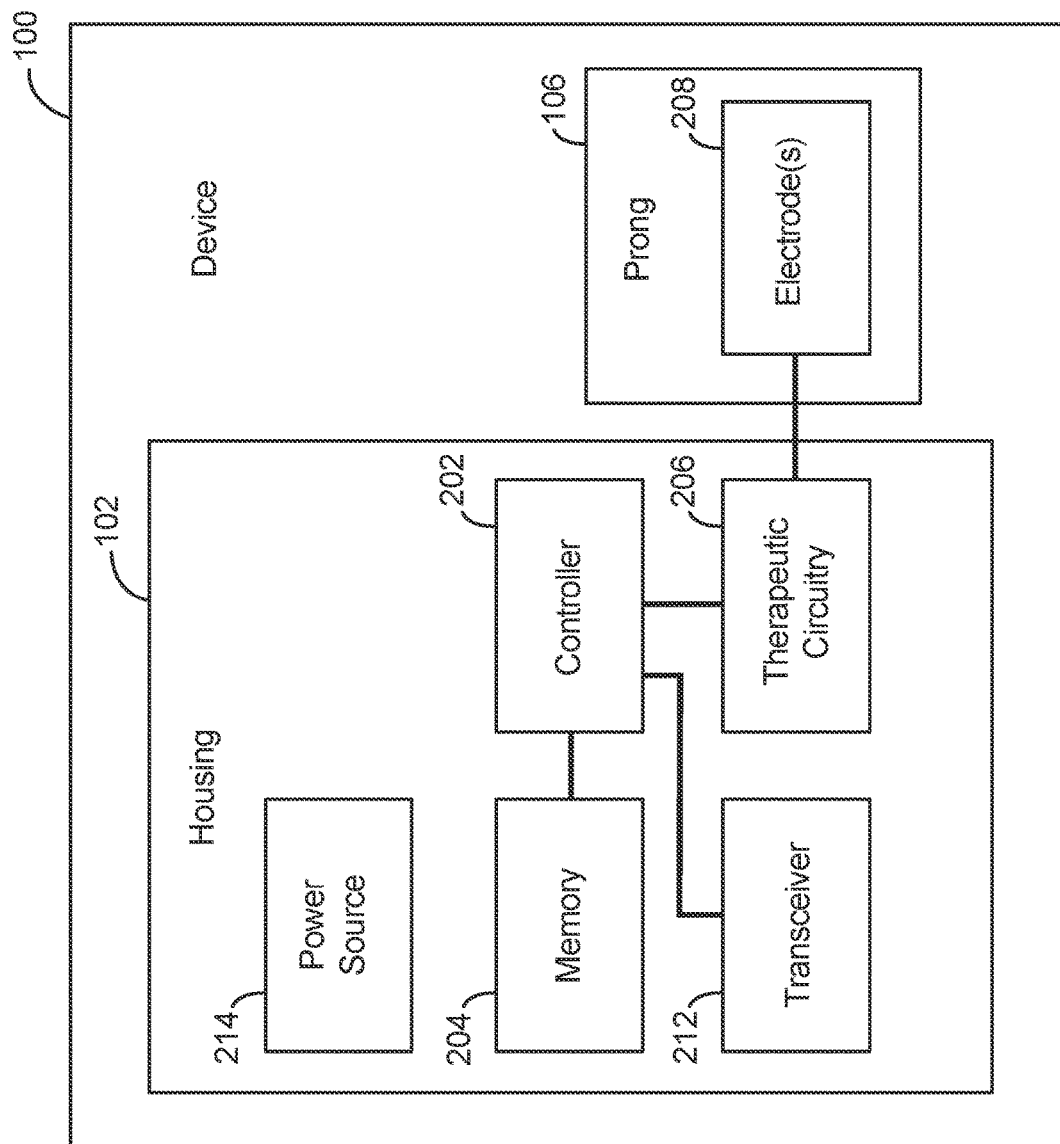
FIG. 6 is a functional block diagram of the first embodiment of the subcutaneous device.

FIG. 6 is a functional block diagram of subcutaneous device 100. Subcutaneous device 100 includes housing 102, prong 106, controller 202, memory 204, therapy circuitry 206, electrode(s) 208, transceiver 212, and power source 214.

Housing 102 of subcutaneous device 100 contains controller 202, memory 204, and therapy circuitry 206. Controller 202 is in electrical communication with memory 204. Controller 202 is configured to execute instructions stored in memory 204 to provide electrical stimulation to create an electric field around one or more blood vessels of a patient. Controller 202 is also in electrical communication with therapy circuitry 206. Controller 202 will send instructions to therapy circuitry 206 to provide electrical stimulation to create the electric field around the one or more blood vessels to prevent plaque formation and break-up plaque already formed in the one or more blood vessels. Therapy circuitry 206 is in electrical communication with electrode(s) 208 positioned on prong 106 of subcutaneous device 100. Electrode(s) 208 are positioned adjacent to the blood vessel when subcutaneous device 100 is implanted in the patient. Electrode(s) 208 are configured to provide electrical stimulation to create the electric field around the one or more blood vessels. For example, electrode(s) 208 can include electrode 172 shown in FIGS. 3A-3D.

Housing 102 further contains transceiver 212 and power source 214. Controller 202 is in electrical communication with transceiver 212. Transceiver 212 can receive information and instructions from outside of subcutaneous device 100. Power source 214 is also positioned in housing 102 and provides power to the components in housing 102 and prong 106, as needed. Power source 214 can be a battery that provides power to the components in housing 102 and prong 106.

Controller 202 is configured to implement functionality and/or process instructions for execution within subcutaneous device 100. Controller 202 can process instructions stored in memory 204. Examples of controller 202 can include any one or more of a microcontroller, a microprocessor, a digital signal processor (DSP), an application specific integrated circuit (ASIC), a field-programmable gate array (FPGA), or other equivalent discrete or integrated logic circuitry.

Memory 204 can be configured to store information within subcutaneous device 100 during operation. Memory 204, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 204 is a temporary memory, meaning that a primary purpose of memory 204 is not long-term storage. Memory 204, in some examples, is described as volatile memory, meaning that memory 204 does not maintain stored contents when power to subcutaneous device 100 is turned off. Examples of volatile memories can include random access memories (RAM), dynamic random access memories (DRAM), static random access memories (SRAM), and other forms of volatile memories. In some examples, memory 204 is used to store program instructions for execution by controller 202. Memory 204, in one example, is used by software or applications running on subcutaneous device 100 to temporarily store information during program execution.

Memory 204, in some examples, also includes one or more computer-readable storage media. Memory 204 can be configured to store larger amounts of information than volatile memory. Memory 204 can further be configured for long-term storage of information. In some examples, memory 204 can include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Controller 202 can execute instructions stored in memory 204 to send instructions to therapy circuitry 206 to deliver an electrical stimulation to create an electric field around the one or more blood vessels via electrode(s) 208. Therapy circuitry 206 is electrically coupled to electrode(s) 208 via conductors extending through prong 106 and into housing 102. Therapy circuitry 206 is configured to deliver an electrical stimulation to create an electric field around the one or more blood vessels via electrode(s) 208. Therapy circuitry 206 will include a capacitor to generate the electrical stimulation. Therapy circuitry 206 can be any suitable circuitry, including microcontroller, power sources, capacitors, and digital to analog converters. Therapy circuitry 206 is configured to provide a pulsating electrical stimulation to create a pulsating electric field around the one or more blood vessels.

In the embodiment shown in FIGS. 1-6, a single electrode 208 is positioned on prong 106. Electrode 208 acts as a negative electrode and forms a vector with housing 102 that acts as a positive electrode. The electric field created by electrode 208 extends between and around housing 102 and electrode 208 on prong 106. The electric field can be an electromagnetic field. Any blood vessel in the electric field will be receive the electrical energy from the electric field to prevent the build-up of plaque and break up plaque already built-up in the blood vessels. In alternate embodiments, electrode 208 can create an electric field between and around electrode 208 and an electrode positioned on housing 102 or clip 104. In an embodiment with two or more prongs each having an electrode, the electric field can be created between and around the electrodes on the two or more prongs.

Subcutaneous device 100 also includes transceiver 212. Subcutaneous device 100, in one example, utilizes transceiver 212 to communicate with external devices via wireless communication. Subcutaneous device 100, in a second example, utilizes transceiver 212 to communication with other devices implanted in the patient via wireless communication. Transceiver 212 can be a network interface card, such as an Ethernet card, an optical transceiver, a radio frequency transceiver, or any other type of device that can send and receive information. Other examples of such network interfaces can include Bluetooth, 3G, 4G, WiFi radio computing devices, Universal Serial Bus (USB), standard inductive coupling, low frequency medical frequency radio (MICS), ultra-wide band radio, standard audio, and ultrasonic radio. Examples of external devices that transceiver 212 can communicate with include laptop computers, mobile phones (including smartphones), tablet computers, personal digital assistants (PDAs), desktop computers, servers, mainframes, cloud servers, or other devices. Other devices implanted in the body can include other implantable medical devices, such as other pacemakers, implantable cardioversion-defibrillators, nerve stimulators, and the like. Transceiver 212 can also be connected to an antenna.

Subcutaneous device 100 includes power source 214 positioned in housing 102. Subcutaneous device 100 can also include a battery or device outside of housing 102 that transmits power and data to subcutaneous device 100 through wireless coupling or RF. Further, power source 214 can be a rechargeable battery.

Memory 204 will store instructions that can be communicated to controller 202 to provide pulsating electrical stimulation to create a pulsating electric field around one or more blood vessels in the patient. The electrical stimulation is provided as pulses at a set frequency, thus is a pulsating electrical stimulation. For example, the frequency of the pulsating electrical stimulation can be between 1 pulse per minute and 30 pulses per minute. Providing the electrical stimulation as a pulsating electrical stimulation allows for a pulsating electrical field to be created around the one or more blood vessels to prevent plaque build-up in the one or more blood vessels and/or to break up already built-up plaque in the one or more blood vessels. The energy level of the electrical signal can be similar to or lower than an energy level of an electrical signal provided to a heart from a traditional pacemaker device. For example, the amplitude of the electrical stimulation can be between 0.5 volts and 4.0 volts at a pulse width of 250 milliseconds to 1000 milliseconds. The energy level is selected to create an electric field around the one or more blood vessels but not pulse or shock organs surrounding the one or more blood vessels. For example, if subcutaneous device 100 is configured to create an electric field around one or more arteries surrounding the heart, the energy level should be selected to create an electric field around the arteries but not provide a pulse or shock to the heart.

Additionally, the pulsating electrical stimulation can be applied for any suitable duration. For example, the pulsating electrical stimulation can be applied continuously for two to six weeks, but could be duty cycled so that it only occurs when a patient is sleeping. After a set period of time has passed, power source 214 can be wirelessly recharged. The pulsating electrical stimulation creates a pulsating electric field around the one or more blood vessels to prevent plaque build-up in the one or more blood vessels and/or to break up already built-up plaque in the one or more blood vessels to prevent and treat atherosclerosis. The frequency, amplitude, and duration of the electrical stimulation can be modified to adjust the strength and frequency of the pulsating electric field.

The internal components of subcutaneous device 100 described above in reference to FIG. 6 is intended to be exemplary. Subcutaneous device 100 can include more, less, or other suitable components. For example, subcutaneous device 100 can include sensing circuitry electrically coupled to electrode(s) 208 on prong 106, electrodes positioned on housing 102 or clip 104, or sensor(s) positioned on housing 102, clip 104, or prong 106. The sensing circuitry can be electrically coupled to controller 202 and is configured to sense an electrical signal from electrode(s) 208 on prong 106, electrodes positioned on housing 102 or clip 104, or sensors positioned on housing 102, clip 104, or prong 106 that can be communicated to controller 202. Controller 202 can receive the electrical signals from the sensing circuitry and/or analyze the electrical signals. The sensor(s) can include any suitable sensor, including, but not limited to, temperature sensors, accelerometers, pressure sensors, proximity sensors, infrared sensors, optical sensors, and ultrasonic sensors. The information from the sensor(s) allows subcutaneous device 100 to sense physiological parameters of a patient. For example, the data from the sensors can be used to calculate heart rate, heart rhythm, respiration rate, respiration waveform, activity, movement, posture, oxygen saturation, photoplethysmogram (PPG), blood pressure, core body temperature, pulmonary edema, and pulmonary wetness. The accelerometer can also be used for rate responsive pacing.

Figure 7A:
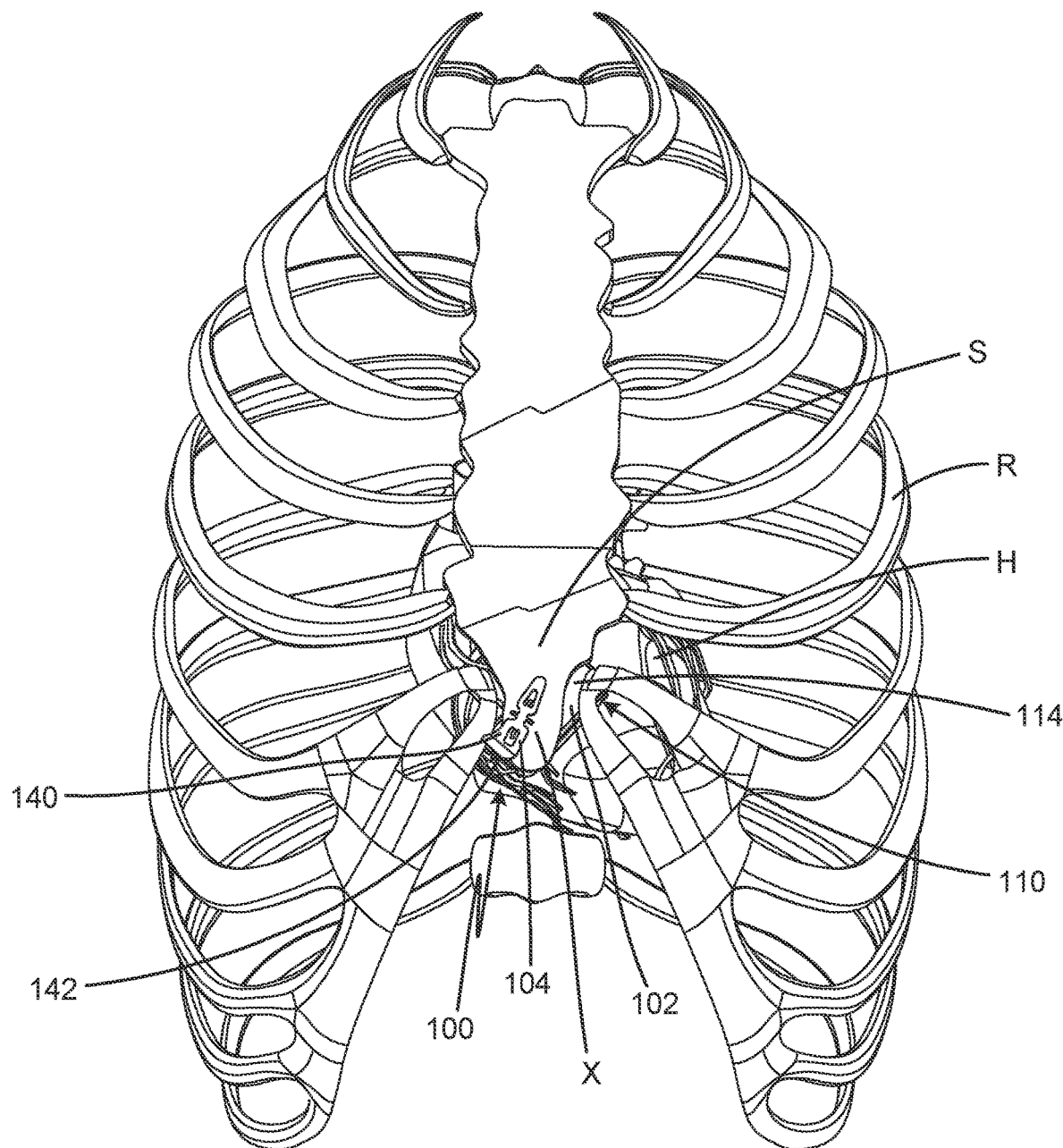
FIG. 7A front view of the first embodiment of the subcutaneous device positioned on a xiphoid process and a sternum.
Figure 7B:
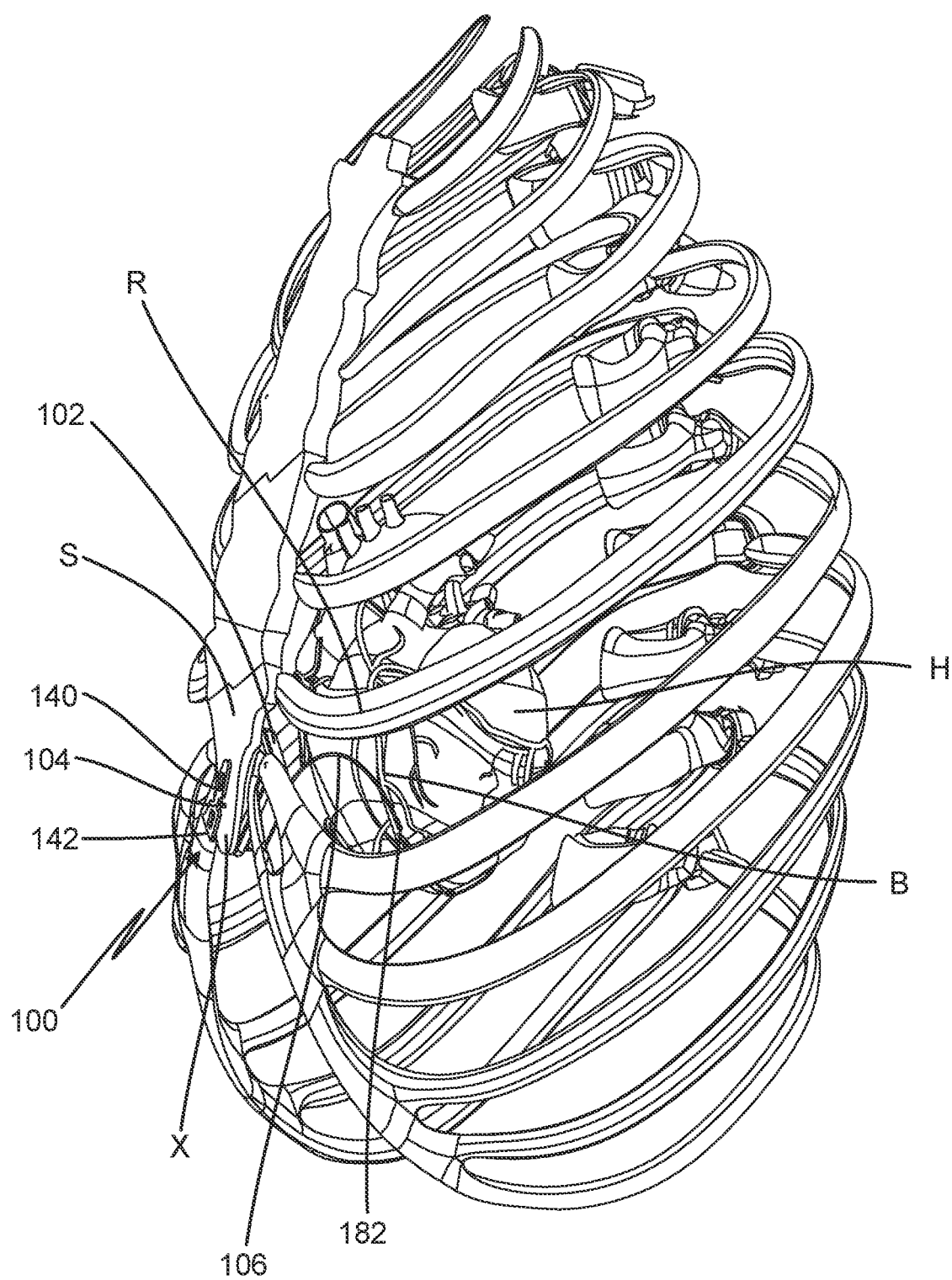
FIG. 7B is a side perspective view of the first embodiment of the subcutaneous device positioned on the xiphoid process and the sternum and showing a positioning of a prong adjacent to a blood vessel.
Figure 8A:
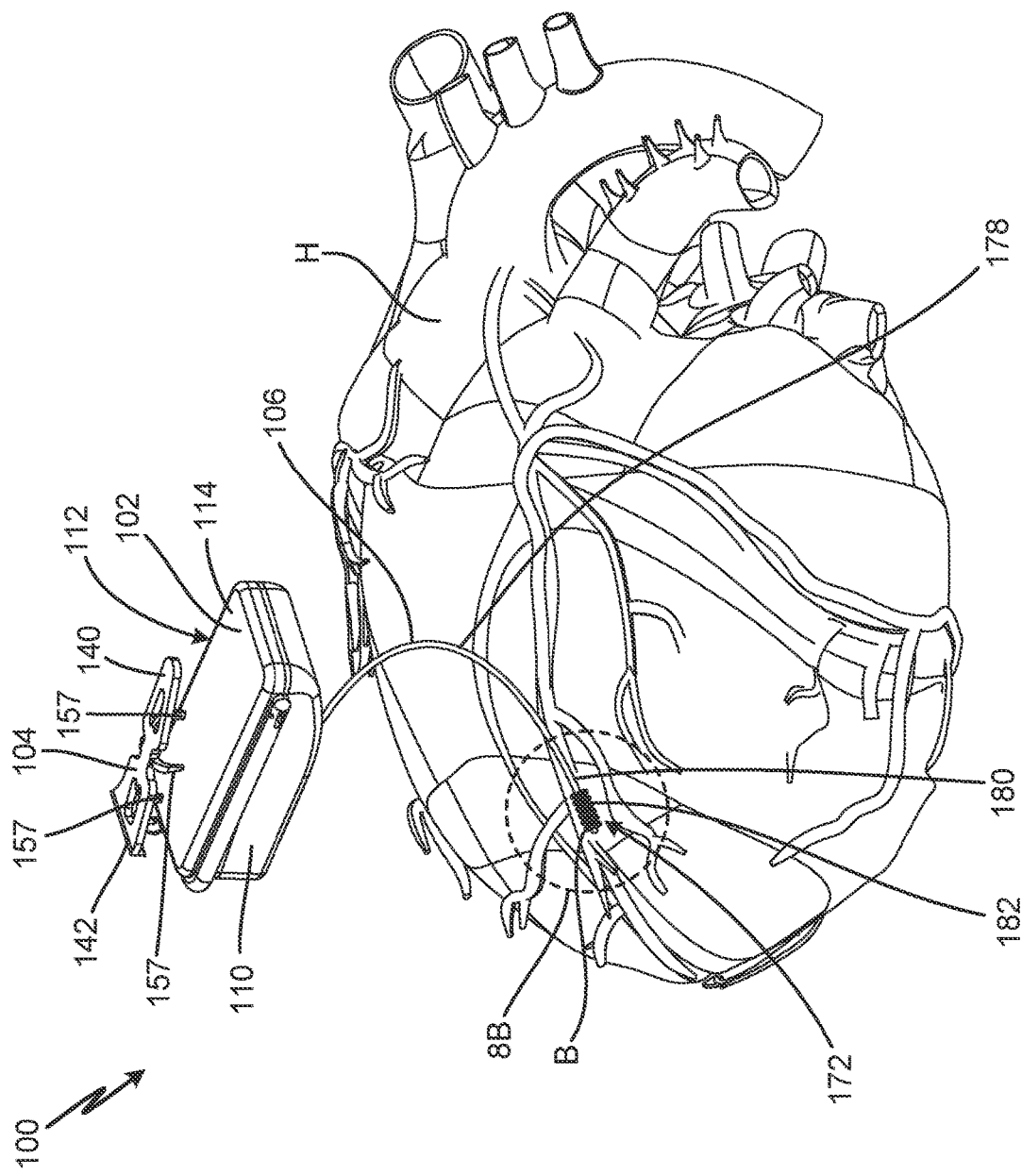
FIG. 8A is a perspective view of the first embodiment of the subcutaneous device and showing a positioning of the prong adjacent to the blood vessel.
Figure 8B:
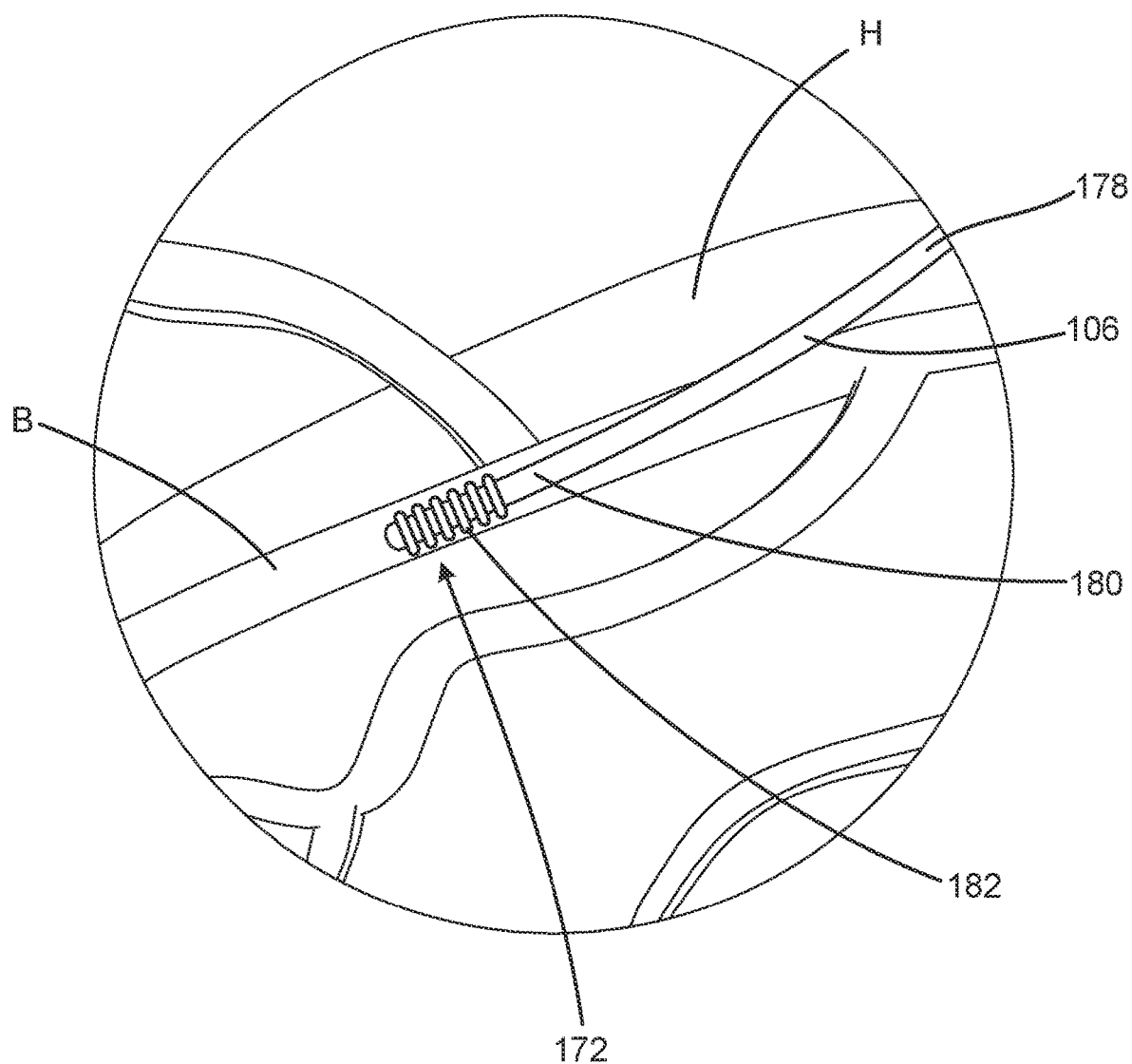
FIG. 8B is an enlarged view of the prong positioned adjacent to the blood vessel, identified by dashed circle 8B in FIG. 8A.

FIG. 7A front view of subcutaneous device 100 positioned on xiphoid process X and sternum S. FIG. 7B is a side perspective view of subcutaneous device 100 positioned on xiphoid process X and sternum S and showing a positioning of prong 106 adjacent to blood vessel B. FIG. 8A is a perspective view of subcutaneous device 100 and showing a positioning of prong 106 adjacent to blood vessel B. FIG. 8B is an enlarged view of prong 106 positioned adjacent to blood vessel B, identified by dashed circle 8B in FIG. 8A. Subcutaneous device 100 includes housing 102, clip 104, and prong 106. Housing 102 includes first side 110, top side 114, and bottom side 116. Clip 104 includes anchoring portion 140, mast portion 142, and tines 157. Prong 106 includes distal end 172, arm portion 178, therapeutic portion 180, and electrode 182. FIGS. 7A-7B show xiphoid process X, sternum S, ribs R, and heart H. FIG. 7B further shows blood vessels B. FIGS. 8A-8B show heart H and blood vessels B.

Subcutaneous device 100 includes housing 102, clip 104, and prong 106 as described above in reference to FIGS. 1-6.

Subcutaneous device 100 is a medical device for treating atherosclerosis. Subcutaneous device 100 can be anchored to xiphoid process X and sternum S of a patient. Xiphoid process X is a process extending from a lower end of sternum S. When subcutaneous device 100 is anchored to xiphoid process X, housing 102 of subcutaneous device 100 will be partially positioned underneath sternum S of the patient. In some patients, xiphoid process X is absent, small, narrow, or elongated, and subcutaneous device 100 can be attached directly to a distal end of sternum S. Subcutaneous device 100 will be positioned in the anterior mediastinum of the patient when it is anchored to the xiphoid process X and sternum S. The anterior mediastinum is an area that is anterior to the pericardium, posterior to sternum S, and inferior to the thoracic plane. The anterior mediastinum includes loose connective tissues, lymph nodes, and substernal musculature.

Subcutaneous device 100 can be implanted with a simple procedure where subcutaneous device 100 is injected onto xiphoid process X and sternum S using a surgical instrument. An example surgical instrument and method of use thereof is shown in and described in U.S. application Ser. No. 17/020,356, filed on Sep. 14, 2020, and entitled "Clip Design for a Subcutaneous Device," the disclosure of which is incorporated by reference in its entirety. The surgical instrument can be designed to accommodate the shape of subcutaneous device 100 and can be configured to push subcutaneous device 100 out of the surgical instrument and onto xiphoid process X and sternum S. A small incision will be made under xiphoid process X of the patient. The surgical instrument that is pre-loaded with subcutaneous device 100 will be inserted through the incision and advanced to xiphoid process X and sternum S. Anatomical markers can be used to guide subcutaneous device 100 towards xiphoid process X and sternum S. For example, housing 102 of subcutaneous device 100 is directed toward the intercostal space between the fifth rib and sixth rib, to the left of sternum S, which directs prong 106 to blood vessel B positioned adjacent to a left ventricle of heart H. As a result, subcutaneous device 100 can be injected in a single direction, minimizing patient trauma. The surgical instrument pre-loaded with subcutaneous device 100 will be positioned at a distal end of xiphoid process X and/or sternum S and the surgical instrument can be activated to push clip 104 of subcutaneous device 100 onto xiphoid process X and/or sternum S. Cardiac catheterization labs are not needed to deploy subcutaneous device 100. When subcutaneous device 100 is deployed onto xiphoid process X and sternum S, housing 102 and prong 106 of subcutaneous device 100 will move through the mediastinum. Prong 106 is made of a stiff material to allow it to push through the tissue in the mediastinum.

Subcutaneous device 100 can then be anchored to xiphoid process X and/or sternum S with clip 104. Clip 104 will hold subcutaneous device 100 in position on xiphoid process X and sternum S. While anchoring portion 140 of clip 104 is angled with respect to housing 102, anchoring portion 140 remains within the width of housing 102, between first side 110 and second side 112 of housing 102. As such, the width of subcutaneous device 100 is the width of housing 102. The width of the incision into the patient to insert subcutaneous device 100 does not increase with angled clip 102. Thus, subcutaneous device 100 only requires a small incision, having a width about equal to the width of housing 102, to be injected into or pulled out of the patient, maintaining minimal trauma to the patient.

Clip 104 is in an open position when subcutaneous device 100 is inserted into the patient. Opening O (shown in FIG. 3D) between anchoring portion 140 of clip 104 and top side 114 of housing 102 is advanced around xiphoid process X and sternum S. Anchoring portion 140 of clip 104 is positioned superior to xiphoid process X and sternum S. When clip 104 is positioned on xiphoid process X and sternum S, mast portion 142 of clip 104 is advanced deeper into receiving portion 122 (shown in FIGS. 3A-4) of housing 102, engaging pins 158 (shown in FIGS. 3A-5) of clip 104 with desired slots 166 (shown in FIGS. 3A-4) of coupler 126 (shown in FIGS. 3A-4) of receiving portion 122. As a result, anchoring portion 140 of clip 104 is pulled closer to top side 114 of housing 102. Opening O is decreased as clip 104 moves into a closed position. When clip 104 is positioned on xiphoid process X and sternum S in the closed positioned, the ratchet mechanism formed by pins 158 of clip 104 and slots 166 of coupler 126 of receiving portion 122 forces anchoring portion 140 down onto xiphoid process X and sternum S to anchor clip 104 to xiphoid process X and sternum S. Further, tines 157 contact and connect to xiphoid process X and/or sternum S to further anchor subcutaneous device 100 to xiphoid process X and sternum S. Tines 157 dig into the sternal tissue, muscle, and/or bone based on the amount of pressure placed on anchoring portion 140 of clip 104 by pins 158. Under pressure from the engagement of pins 158 and slots 166, anchoring portion 140 can be pushed onto xiphoid process X and sternum S as well as top side 114 of housing 102 such that tines 157 bend back around into xiphoid process X and sternum S. Clip 104 anchors subcutaneous device 100 to xiphoid process X and sternum S.

Clip 104 holds subcutaneous device 100 in position on xiphoid process X and sternum S. When subcutaneous device 100 is anchored to xiphoid process X and sternum S, prong 106 will extend from housing 102 and be positioned adjacent to blood vessels B of the patient. Specifically, therapeutic portion 180 and electrode 182 of prong 106 will be positioned adjacent to one blood vessel B. Blood vessel B is an artery positioned over heart H in the embodiment shown in FIGS. 7A-8B. A pulsating electrical stimulation can be applied to create a pulsating electric field around blood vessels B, which include the one blood vessel B positioned adjacent to electrode 182 on prong 106 and other blood vessels near the one blood vessel B. The pulsating electrical stimulation creates a pulsating electric field around blood vessels B by transmitting the pulsating electrical signals from electrode 182 on distal end 172 of prong 106 into an area surrounding blood vessels B. Prong 106 can be shaped to be positioned adjacent to any blood vessels B surrounding heart H or any other blood vessels B that can be reached with prong 106. Specifically, prong 106 can be shaped to be positioned adjacent to any blood vessels B around the right ventricle, left ventricle, right atrium, or left atrium of heart H. Further, the energy level of the electrical stimulation that is applied to create the electric field around blood vessels B can be adjusted to vary the scope of the electric field. The energy level should be low enough that the electrical stimulation will not pulse or shock heart H.

Subcutaneous device 100 can be implanted with a simple procedure where subcutaneous device 100 is injected onto xiphoid process X or sternum S using a surgical instrument. The surgical procedure for implanting subcutaneous device 100 is less invasive than the surgical procedure required for more traditional medical devices, as subcutaneous device 100 is placed subcutaneously in the body. Anchoring subcutaneous device 100 to xiphoid process X and sternum S via clip 104 ensures that subcutaneous device 100 will not migrate in the patient's body. Maintaining the position of subcutaneous device 100 in the body ensures that prong 106 is properly positioned adjacent to one blood vessel B. Further, subcutaneous device 100 is able to accurately and reliably provide therapeutic pulsating electrical stimulation to create a pulsating electric field around blood vessels B, as subcutaneous device 100 will not move in the patient's body.

Further, creating a pulsating electrical field around blood vessels B with subcutaneous device 100 prevents plaque from building up in blood vessels B and can break up plaque that is already built-up in blood vessels B. Subcutaneous device 100 can be cycled on and off as needed and can be kept in a patient for an extended period of time. Subcutaneous device 100 can include a rechargeable battery that can be recharged on a periodic basis, for example yearly, to extend the life of subcutaneous device 100. The use of subcutaneous device 100 prevents a patient from having to take statins, which can have serious side effects to the patient, and can prevent plaque build-up in blood vessels B, which can prevent the patient from experiencing a heart attack or stroke and potentially having to undergo a surgical procedure to treat an occlusion caused by a plaque build-up. Subcutaneous device 100 may be suited for use in patients with other medical conditions that make traditional atherosclerosis treatments difficult. For example, diabetic patients can have small arteries, which can make it difficult or impossible to stent the arteries. Diabetic patients may be served by the prophylactic use of subcutaneous device 100 to prevent plaque build-up if they exhibit risk factors for atherosclerosis. Subcutaneous device 100 can also be used in conjunction with a pacemaker or defibrillator device.

Subcutaneous Device 300

FIG. 9 is a front perspective view of subcutaneous device 300. FIG. 10 is a back perspective view of subcutaneous device 300 anchored to structural body component(s) A. Subcutaneous device 300 includes housing 302, anchoring arms 304 (including first anchoring arm 304A and second anchoring arm 304B), and prong 306. FIG. 10 shows structural body component(s) A and blood vessel B.

Subcutaneous device 300 is a medical device that is configured to be anchored to structural body component(s) A. Structural body component(s) A may be a muscle, a bone, and/or a tissue of a patient. Subcutaneous device 300 is a subcutaneous device for treating atherosclerosis. Specifically, subcutaneous device 300 can provide therapeutic electrical stimulation to create a pulsating electric field around blood vessel B to treat atherosclerosis. Blood vessel B can be an artery or a vein in a patient. Subcutaneous device 300 can provide a pulsating electrical stimulation to create a pulsating electric field around blood vessel B to prevent plaque build-up and break up plaque already built-up in blood vessel B. The pulsating electric field created around blood vessel B may also prevent plaque build-up and break up plaque already built-up in other blood vessels near blood vessel B. Subcutaneous device 300 includes housing 302. Housing 302 can contain a power source, a controller, a memory, a transceiver, therapeutic circuitry, and/or any other component of a medical device.

Anchoring arms 304 are attached to housing 302. Anchoring arms 304 are anchoring mechanisms that are configured to anchor subcutaneous device 300 to structural body component(s) A. Structural body component(s) A can be a muscle, a bone, and/or a tissue. Anchoring arms 304 includes first anchoring arm 304A attached to a first side of housing 302 and second anchoring arm 304B attached to a second side of housing 302 opposite of first anchoring arm 304A. First anchoring arm 304A and second anchoring arm 304B can be anchored to the same structural body component A (i.e., the same muscle, bone, or tissue) or to different structural body components A (i.e., different muscles, bones, or tissues) positioned on opposite sides of housing 302. Anchoring arms 304 use an active fixation method such as sutures, tines, pins, screws, and/or any other suitable anchoring structure to secure anchoring arms 304 to structural body component(s) A. In the embodiment shown in FIGS. 9-10, anchoring arms 304 include tines that are configured to anchor subcutaneous device 100 to structural body component(s) A.

Prong 306 is connected to and extends away from housing 302 of subcutaneous device 300. Prong 306 is configured to be positioned adjacent to blood vessel B that is positioned away from structural body component A. Prong 306 includes one or more electrodes that are capable of providing therapeutic pulsating electrical stimulation to create a pulsating electric field around blood vessel B. A controller in housing 302 of subcutaneous device 300 can send instructions to therapeutic circuitry to provide therapeutic pulsating electrical stimulation to create a pulsating electric field around blood vessel B using the one or more electrodes on prong 306 of subcutaneous device 300.

Subcutaneous device 300 will be discussed in greater detail in relation to FIGS. 11A-14B below.

FIG. 11A is a front perspective view of subcutaneous device 300. FIG. 11B is a bottom perspective view of subcutaneous device 300. Subcutaneous device 300 includes housing 302, anchoring arms 304 (including first anchoring arm 304A and second anchoring arm 304B), and prong 306. Housing 302 includes first side 310, second side 312, top side 314, bottom side 316, front end 318, back end 320, and receiving tube 322. Anchoring arm 304A includes body 340A, housing side 342A, outer side 344A, top side 346A, bottom side 348A, opening 350A, and tines 352A. Anchoring arm 304B includes body 340B, housing side 342B, outer side 344B, top side 346B, bottom side 348B, opening 350B, and tines 352B. Prong 306 includes proximal end 360, distal end 362, base portion 364, arm portion 368, therapeutic portion 370, and electrode 72.

Subcutaneous device 300 includes housing 302, anchoring arms 304, and prong 306 as described in reference to FIGS. 9-10. Housing 302 includes first side 310, second side 312, top side 314, bottom side 316, front end 318, and back end 320. First side 310 is opposite of second side 312; top side 314 is opposite of bottom side 316; and front end 318 is opposite of back end 320. Housing 302 is substantially rectangular-shaped in the embodiment shown. In alternate embodiments, housing 302 can be shaped as a cone, frustum, or cylinder. Housing 302 can be made out of stainless steel, titanium, nitinol, epoxy, silicone, polyurethane with metallic reinforcements, or any other material that is suitable for non-porous implants. Housing 302 can also include an exterior coating.

Receiving tube 322 of housing 302 is connected to bottom side 316 of housing 302. Receiving tube 322 is a cylindrically shaped body extending perpendicularly down from bottom side 316 of housing 302. Receiving tube 322 is configured to receive prong 306.

Anchoring arms 304 includes anchoring arm 304A extending from first side 310 of housing 302 and anchoring arm 304B extending from second side 312 of housing 302. Anchoring arms 304 can be made out of stainless steel, titanium, nitinol, epoxy, silicone, polyurethane with metallic reinforcements, or any other material that is suitable for non-porous implants. Anchoring arm 304A and anchoring arm 304B are integrally formed with housing 302 in the embodiment shown in FIGS. 11A-11B.

Anchoring arm 304A includes body 340A that is substantially rectangular shaped in the embodiment shown in FIGS. 11A-11B, but can have any suitable shape in alternate embodiments. Body 340A extends from housing side 342A to outer side 344A. Housing side 342A is opposite outer side 344A. Anchoring arm 304A is attached to housing 302 at housing side 342A of body 340A. Outer side 344A is an outer edge of body 340A of anchoring arm 304A. Body 340A also has top side 346A opposite bottom side 348A. Opening 350A extends through body 340A from top side 346A to bottom side 348A. Opening 350A is configured to allow anchoring arm 304A to be sutured to a muscle, a bone, or a tissue in a patient to secure subcutaneous device 300 to the muscle, the bone, or the tissue. Further, opening 350A can receive additional fixation mechanisms, such as tines, pins, or screws, to secure subcutaneous device 300 to the muscle, the bone, or the tissue. These additional fixation mechanisms can be made from bioabsorbable materials. In alternate embodiments, any number of openings 350A may extend through body 340A.

Anchoring arm 304B includes body 340B that is substantially rectangular shaped in the embodiment shown in FIGS. 11A-11B, but can have any suitable shape in alternate embodiments. Body 340B extends from housing side 342B to outer side 344B. Housing side 342B is opposite outer side 344B. Anchoring arm 304B is attached to housing 302 at housing side 342B of body 340B. Outer side 344B is an outer edge of body 340B of anchoring arm 304B. Body 340B also has top side 346B opposite bottom side 348B. Opening 350B extends through body 340B from top side 346B to bottom side 348B. Opening 350B is configured to allow anchoring arm 304B to be sutured to a muscle, a bone, or a tissue in a patient to secure subcutaneous device 300 to the muscle, the bone, or the tissue. Further, opening 350B can receive additional fixation mechanisms, such as tines, pins, or screws, to secure subcutaneous device 300 to the muscle, the bone, or the tissue. These additional fixation mechanisms can be made from bioabsorbable materials. In alternate embodiments, any number of openings 350B may extend through body 340B.

In the embodiment shown in FIGS. 11A-11B, tines 352A extend from anchoring arm 304A and tines 352B extend from anchoring arm 304B. Tines 352A have first ends connected to bottom side 348A of body 340A and second ends that extend away from bottom side 348A of body 340A. Tines 352B have first ends connected to bottom side 348B of body 340B and second ends that extend away from bottom side 348B of body 340B. In alternate embodiments, tines 352A and tines 352B may have first ends connected to any suitable portion of anchoring arm 304A and anchoring arm 304B, respectively. Tines 352A and tines 352B are thin and may be made of metal or any other suitable material. In this embodiment, anchoring arm 304A has four tines 352A, and anchoring arm 304B has four tines 352B. In alternate embodiments, anchoring arm 304A and anchoring arm 304B may have any number of tines 352A and tines 352B, respectively. Further, in alternate embodiments, any other suitable anchoring structures or active fixation methods may be used along with or instead of tines 352A and tines 352B. Tines 352A and tines 352B are configured to pierce and anchor to structural body component(s) A, such as a muscle, a bone, or a tissue, as seen in FIG. 10.

Anchoring arm 304A and anchoring arm 304B have a slight curve in the embodiment shown in FIGS. 11A-11B to fit to the muscle, the bone, or the muscle to which they are anchored. In alternate embodiments, anchoring arm 304A and anchoring arm 304B can be flat or have any degree of curvature to fit to any muscle, bone, or tissue.

When subcutaneous device 300 is positioned on the muscle, the bone, or the tissue, anchoring arm 304A and anchoring arm 304B are pressed down onto the muscle, the bone, or the tissue. As anchoring arm 304A and anchoring arm 304B are pressed down onto the muscle, the bone, or the tissue, tines 352A and tines 352B attach to the muscle, the bone, or the tissue, to anchor anchoring arm 304A and anchoring arm 304B, respectively, to the muscle, the bone, or the tissue, as seen in FIG. 10. Tines 352A and tines 352B will pierce the muscle, the bone, or the tissue in response to the pressure being placed on subcutaneous device 300. Tines 352A and tines 352B can bend back around into the muscle, the bone, or the tissue when pressed onto the muscle, the bone, or the first tissue, further securing and anchoring both anchoring arm 304A and anchoring arm 304B of subcutaneous device 300 to the muscle, the bone, or the tissue. Prong 306 connected to and extending away from housing 302 will be positioned adjacent to blood vessel B when housing 302 is anchored to structural body component(s) A.

Tines 352A and tines 352B are also removable from the muscle, the bone, or the tissue such that subcutaneous device 300 is easily removable. The thin metal, or other suitable material, of tines 352A and tines 352B enables tines 352A and tines 352B to maintain flexibility. To remove anchoring arm 304A and anchoring arm 304B from structural body component(s) A, subcutaneous device 300 is pulled away from structural body component(s) A. Pressure on anchoring arm 304A and anchoring arm 304B is reduced as subcutaneous device 300 is pulled away from structural body component(s) A. Subcutaneous device 300 can then be removed from the muscle, the bone, or the tissue and pulled out and removed from the body of the patient. Additional instruments, such as a scalpel or a cautery instrument may be used to assist in removal of subcutaneous device 300 from the muscle, the bone, or the tissue.

Prong 306 includes proximal end 360 and distal end 362 that is opposite of proximal end 360. Proximal end 360 of prong 306 may have strain relief or additional material to support movement. Prong 306 includes base portion 364, arm portion 368, and therapeutic portion 370. A first end of base portion 364 is aligned with proximal end 360 of prong 306, and a second end of base portion 364 is connected to a first end of arm portion 368. Base portion 364 is a straight portion that is attached to housing 302. Specifically, base portion 364 is attached to and secured to receiving tube 322 of housing 302. Base portion 364 extends into receiving tube 322 of housing 302 and is electrically connected to the internal components of housing 302, for example with a feedthrough, to which prong 306 is also connected. Base portion 364 of prong 306 is hermetically sealed in receiving tube 322 of housing 302.

The first end of arm portion 368 is connected to the second end of base portion 364, and a second end of arm portion 368 is connected to a first end of therapeutic portion 370. Arm portion 368 is a curved portion that connects base portion 364 to therapeutic portion 370. Arm portion 368 extends away from housing 302 so that therapeutic portion 370 is positioned outwards from housing 302. In this embodiment, arm portion 368 is a curved portion that extends away from housing 302 in a first direction. In alternate embodiments, arm portion 368 can be straight or curved and extend in any direction to reach any blood vessel B.

The first end of therapeutic portion 370 is connected to the second end of arm portion 368, and a second end of therapeutic portion 370 is aligned with distal end 362 of prong 306. Arm portion 368 extends away from housing 302 so that therapeutic portion 370 is positioned away from housing 302. Therapeutic portion 370 can be positioned adjacent to blood vessel B.

Prong 306 further includes electrode 372. Electrode 372 is shown as being a coil electrode on distal end 362 in the embodiment shown in FIGS. 11A-11B. In alternate embodiments, electrode 372 can be positioned at any point on therapeutic portion 370 and can have any shape and configuration. Further, prong 306 is shown as having a single electrode 372 in the embodiment shown in FIGS. 11A-11B. Prong 306 can have any number of electrodes in alternate embodiments. Electrode 372 is positioned on distal end 362 of prong 306 to provide therapeutic pulsating electrical stimulation to creating a pulsating electric field around blood vessel B and other blood vessels near blood vessel B.

Prong 306 is made of a stiff material so that it is capable of pushing through tissue in the body when subcutaneous device 300 in implanted into a patient. Prong 306 can be made out of nickel titanium, also known as Nitinol. Nitinol is a shape memory alloy with superelasticity, allowing prong 306 to go back to its original shape and position if prong 306 is deformed as subcutaneous device 300 is implanted into a patient. Prong 306 can also be made out of silicone, polyurethane, stainless steel, titanium, epoxy, polyurethane with metallic reinforcements, or any other material that is suitable for non-porous implants. As an example, prong 306 can be made out of a composite made of polyurethane and silicone and reinforced with metal to provide spring stiffness.

Distal end 362 of prong 306 has a rounded shape to prevent prong 306 from puncturing or damaging blood vessel B or other blood vessels, organs, or tissue surrounding blood vessel B, such as the pericardium, heart, or lungs, when therapeutic portion 370 of prong 306 is positioned adjacent to blood vessel B. The overall axial stiffness of prong 306 can be adjusted so that prong 306 can move up, down, and side-to-side in a body of the patient as the patient moves and as a patient's heart beats, but is not stiff or sharp enough to pierce or tear blood vessel B or other blood vessels, organs, or tissue surrounding blood vessel B.

Subcutaneous device 300 is described here as having a single prong 306. In alternate embodiments, subcutaneous device 300 can include any number of prongs and those prongs can have any shape.

Anchoring arm 304A includes tines 352A and anchoring arm 304B includes tines 352B that attach to structural body component(s) A to sufficiently anchor subcutaneous device 300 to structural body component(s) A, ensuring proper alignment of subcutaneous device 300 with respect to structural body component(s) A and blood vessel B. Tines 352A and tines 352B also allow for the removal of subcutaneous device 300 from structural body component(s) A. Thus, subcutaneous device 300 can be both securely implanted and easily removed for repair or replacement using less traumatic insertion and removal processes than a traditional device.

Prong 306 includes electrode 372 on distal end 362 that is configured to be positioned adjacent to blood vessel B. Therapeutic circuitry in housing 302 can be electrically coupled to electrode 372 on prong 306. The therapeutic circuitry is configured to provide pulsating electrical stimulation to create a pulsating electric field around blood vessel B to prevent plaque build-up and/or to break up already built-up plaque in blood vessel B or other blood vessels near blood vessel B in the pulsating electric field. As such, subcutaneous device 300 is configured to prevent and treat atherosclerosis. The pulsating electrical stimulation and pulsating electric field provided by the therapeutic circuitry will be discussed in greater detail with respect to FIG. 12 below.

FIG. 12 is a functional block diagram of subcutaneous device 300. Subcutaneous device 300 includes housing 302, prong 306, controller 402, memory 404, therapy circuitry 406, electrode(s) 408, transceiver 412, and power source 414.

Housing 302 of subcutaneous device 300 contains controller 402, memory 404, and therapy circuitry 406. Controller 402 is in electrical communication with memory 404. Controller 402 is configured to execute instructions stored in memory 404 to provide electrical stimulation to create an electric field around one or more blood vessels of a patient. Controller 402 is also in electrical communication with therapy circuitry 406. Controller 402 will send instructions to therapy circuitry 406 to provide electrical stimulation to create the electric field around the one or more blood vessels to prevent plaque formation and break-up plaque already formed in the one or more blood vessels. Therapy circuitry 406 is in electrical communication with electrode(s) 408 positioned on prong 306 of subcutaneous device 300. Electrode(s) 408 are positioned adjacent to the blood vessel when subcutaneous device 300 is implanted in the patient. Electrode(s) 408 are configured to provide electrical stimulation to create the electric field around the one or more blood vessels. For example, electrode(s) 408 can include electrode 162 shown in FIGS. 11A-11B.

Housing 302 further contains transceiver 412 and power source 414. Controller 402 is in electrical communication with transceiver 412. Transceiver 412 can receive information and instructions from outside of subcutaneous device 300. Power source 414 is also positioned in housing 302 and provides power to the components in housing 302 and prong 306, as needed. Power source 414 can be a battery that provides power to the components in housing 302 and prong 306.

Controller 402 is configured to implement functionality and/or process instructions for execution within subcutaneous device 300. Controller 402 can process instructions stored in memory 404. Examples of controller 402 can include any one or more of a microcontroller, a microprocessor, a digital signal processor (DSP), an application specific integrated circuit (ASIC), a field-programmable gate array (FPGA), or other equivalent discrete or integrated logic circuitry.

Memory 404 can be configured to store information within subcutaneous device 300 during operation. Memory 404, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 404 is a temporary memory, meaning that a primary purpose of memory 404 is not long-term storage. Memory 404, in some examples, is described as volatile memory, meaning that memory 404 does not maintain stored contents when power to subcutaneous device 300 is turned off. Examples of volatile memories can include random access memories (RAM), dynamic random access memories (DRAM), static random access memories (SRAM), and other forms of volatile memories. In some examples, memory 404 is used to store program instructions for execution by controller 402. Memory 404, in one example, is used by software or applications running on subcutaneous device 300 to temporarily store information during program execution.

Memory 404, in some examples, also includes one or more computer-readable storage media. Memory 404 can be configured to store larger amounts of information than volatile memory. Memory 404 can further be configured for long-term storage of information. In some examples, memory 404 can include non-volatile storage elements. Examples of such non-volatile storage elements can include magnetic hard discs, optical discs, floppy discs, flash memories, or forms of electrically programmable memories (EPROM) or electrically erasable and programmable (EEPROM) memories.

Controller 402 can execute instructions stored in memory 404 to send instructions to therapy circuitry 406 to deliver an electrical stimulation to create an electric field around the one or more blood vessels via electrode(s) 408. Therapy circuitry 406 is electrically coupled to electrode(s) 408 via conductors extending through prong 306 and into housing 302. Therapy circuitry 406 is configured to deliver an electrical stimulation to create an electric field around the one or more blood vessels via electrode(s) 408. Therapy circuitry 406 will include a capacitor to generate the electrical stimulation. Therapy circuitry 406 can be any suitable circuitry, including microcontroller, power sources, capacitors, and digital to analog converters. Therapy circuitry 406 is configured to provide a pulsating electrical stimulation to create a pulsating electric field around the one or more blood vessels.

In the embodiment shown in FIGS. 9-11B, a single electrode 408 is positioned on prong 306. Electrode 408 acts as a negative electrode and forms a vector with housing 302 that acts as a positive electrode. The electric field created by electrode 408 extends between and around housing 302 and electrode 408 on prong 306. The electric field can be an electromagnetic field. Any blood vessel in the electric field will receive the electrical energy from the electric field to prevent the build-up of plaque and break up plaque already built-up in the blood vessels. In alternate embodiments, electrode 408 can create an electric field between and around electrode 408 and an electrode positioned on housing 302 or anchoring arms 304. In an embodiment with two or more prongs each having an electrode, the electric field can be created between and around the electrodes on the two or more prongs.

Subcutaneous device 300 also includes transceiver 412. Subcutaneous device 300, in one example, utilizes transceiver 412 to communicate with external devices via wireless communication. Subcutaneous device 300, in a second example, utilizes transceiver 412 to communication with other devices implanted in the patient via wireless communication. Transceiver 412 can be a network interface card, such as an Ethernet card, an optical transceiver, a radio frequency transceiver, or any other type of device that can send and receive information. Other examples of such network interfaces can include Bluetooth, 3G, 4G, WiFi radio computing devices, Universal Serial Bus (USB), standard inductive coupling, low frequency medical frequency radio (MICS), ultra-wide band radio, standard audio, and ultrasonic radio. Examples of external devices that transceiver 412 can communicate with include laptop computers, mobile phones (including smartphones), tablet computers, personal digital assistants (PDAs), desktop computers, servers, mainframes, cloud servers, or other devices. Other devices implanted in the body can include other implantable medical devices, such as other pacemakers, implantable cardioversion-defibrillators, nerve stimulators, and the like. Transceiver 412 can also be connected to an antenna.

Subcutaneous device 300 includes power source 414 positioned in housing 302. Subcutaneous device 300 can also include a battery or device outside of housing 302 that transmits power and data to subcutaneous device 300 through wireless coupling or RF. Further, power source 414 can be a rechargeable battery.

Memory 404 will store instructions that can be communicated to controller 402 to provide pulsating electrical stimulation to create a pulsating electric field around one or more blood vessels in the patient. The electrical stimulation is provided as pulses at a set frequency, thus is a pulsating electrical stimulation. For example, the frequency of the pulsating electrical stimulation can be between 1 pulse per minute and 30 pulses per minute. Providing the electrical stimulation as a pulsating electrical stimulation allows for a pulsating electrical field to be created around the one or more blood vessels to prevent plaque build-up in the one or more blood vessels and/or to break up already built-up plaque in the one or more blood vessels. The energy level of the electrical signal can be similar to or lower than an energy level of an electrical signal provided to a heart from a traditional pacemaker device. For example, the amplitude of the electrical stimulation can be between 0.5 volts and 4.0 volts at a pulse width of 250 milliseconds to 1000 milliseconds. The energy level is selected to create an electric field around the one or more blood vessels but not pulse or shock organs surrounding the one or more blood vessels. For example, if subcutaneous device 300 is configured to create an electric field around one or more arteries surrounding the heart, the energy level should be selected to create an electric field around the arteries but not provide a pulse or shock to the heart.

Additionally, the pulsating electrical stimulation can be applied for any suitable duration. For example, the pulsating electrical stimulation can be applied continuously for two to six weeks, but could be duty cycled so that it only occurs when a patient is sleeping. After a set period of time has passed, power source 414 can be wirelessly recharged. The pulsating electrical stimulation creates a pulsating electric field around the one or more blood vessels to prevent plaque build-up in the one or more blood vessels and/or to break up already built-up plaque in the one or more blood vessels to prevent and treat atherosclerosis. The frequency, amplitude, and duration of the electrical stimulation can be modified to adjust the strength and frequency of the pulsating electric field.

The internal components of subcutaneous device 300 described above in reference to FIG. 12 is intended to be exemplary. Subcutaneous device 300 can include more, less, or other suitable components. For example, subcutaneous device 300 can include sensing circuitry electrically coupled to electrode(s) 408 on prong 306, electrodes positioned on housing 302 or anchoring arms 304, or sensor(s) positioned on housing 302, anchoring arms 304, or prong 306. The sensing circuitry can be electrically coupled to controller 402 and is configured to sense an electrical signal from electrode(s) 408 on prong 306, electrodes positioned on housing 302 or anchoring arms 304, or sensors positioned on housing 302, anchoring arms 304, or prong 306 that can be communicated to controller 402. Controller 402 can receive the electrical signals from the sensing circuitry and/or analyze the electrical signals. The sensor(s) can include any suitable sensor, including, but not limited to, temperature sensors, accelerometers, pressure sensors, proximity sensors, infrared sensors, optical sensors, and ultrasonic sensors. The information from the sensor(s) allows subcutaneous device 300 to sense physiological parameters of a patient. For example, the data from the sensors can be used to calculate heart rate, heart rhythm, respiration rate, respiration waveform, activity, movement, posture, oxygen saturation, photoplethysmogram (PPG), blood pressure, core body temperature, pulmonary edema, and pulmonary wetness. The accelerometer can also be used for rate responsive pacing.

FIG. 13A front view of subcutaneous device 300 positioned on ribs R. FIG. 13B is a side perspective view of subcutaneous device 300 positioned on ribs R and showing a positioning of prong 306 adjacent to blood vessel B. FIG. 14A is a perspective view of subcutaneous device 300 and showing a positioning of prong 306 adjacent to blood vessel B. FIG. 14B is an enlarged view of prong 306 positioned adjacent to blood vessel B, identified by dashed circle 14B in FIG. 14A. Subcutaneous device 300 includes housing 302, anchoring arms 304 (including anchoring arms 304A and anchoring arms 304B), and prong 306. Anchoring arm 304A includes tines 352A. Anchoring arm 304B includes tines 352B. Prong 306 includes distal end 362, arm portion 368, therapeutic portion 370, and electrode 372. FIGS. 13A-13B show ribs R, including fifth rib R5 and sixth rib R6, and heart H. FIG. 13B further shows blood vessels B. FIGS. 14A-14B show heart H and blood vessels B.

Subcutaneous device 300 includes housing 302, anchoring arms 304, and prong 306 as described above in reference to FIGS. 9-12. Subcutaneous device 300 is a medical device for treating atherosclerosis. Subcutaneous device 300 can be anchored to ribs R of a patient. When subcutaneous device 300 is anchored to ribs R, housing 302 of subcutaneous device 300 will be positioned in an intercostal space of the patient.

Subcutaneous device 300 can be implanted with a simple procedure where subcutaneous device 300 is injected onto ribs R using a surgical instrument. An example surgical instrument and method of use thereof is shown in and described in U.S. application Ser. No. 17/020,356, filed on Sep. 14, 2020, and entitled "Clip Design for a Subcutaneous Device," the disclosure of which is incorporated by reference in its entirety. The surgical instrument can be designed to accommodate the shape of subcutaneous device 300 and can be configured to push subcutaneous device 300 out of the surgical instrument and onto ribs R. In the embodiment shown in FIGS. 13A-13B, subcutaneous device 300 is anchored to fifth rib R5 and sixth rib R6 on the left side of the patient. Specifically, first anchoring arm 304A is anchored to sixth rib R6 and second anchoring arm 304B is anchored to fifth rib R5. In alternate embodiments, subcutaneous device 300 can be anchored to the fourth rib and the fifth rib on the left side of the patient, the fifth rib and the sixth rib on the right side of the patient, the fourth rib and the fifth rib on the right side of the patient, or any other adjacent ribs. A small incision is made over ribs R of the patient. The surgical instrument that is pre-loaded with subcutaneous device 300 will be inserted through the incision and advanced to ribs R. Anatomical markers can be used to guide subcutaneous device 300 towards ribs R. For example, housing 302 of subcutaneous device 300 is directed toward the intercostal space between fifth rib R5 and sixth rib R6 to the patient's left side of ribs R, which directs prong 106 to blood vessel B positioned adjacent to a left ventricle of heart H. As a result, subcutaneous device 300 can be injected in a single direction, minimizing patient trauma. The surgical instrument pre-loaded with subcutaneous device 300 will be positioned over ribs R, in this embodiment fifth rib R5 and sixth rib R6, and the surgical instrument can be activated to push anchoring arms 304 of subcutaneous device 300 on ribs R, in this embodiment fifth rib R5 and sixth rib R6. Cardiac catheterization labs are not needed to deploy subcutaneous device 300. Housing 302 will be positioned in the intercostal space between fifth rib R5 and sixth rib R6. When subcutaneous device 300 is deployed onto ribs R, housing 302 will be pushed into the intercostal space and prong 306 of subcutaneous device 300 will move through the mediastinum. Prong 306 is made of a stiff material to allow it to push through the tissue in the mediastinum.

Subcutaneous device 300 can then be anchored to ribs R with anchoring arms 304. Anchoring arms 304 will hold subcutaneous device 300 in position on ribs R. Tines 352A and tines 352B contact and connect to ribs R to anchor subcutaneous device 300 to ribs R. Tines 352A and tines 352B dig into the rib tissue, muscle, and/or bone based on the amount of pressure placed on anchoring arms 304. Under pressure, anchoring arms 304 can be pushed onto ribs R such that tines 352A and tines 352B bend back around into ribs R. Anchoring arms 304 anchor subcutaneous device 300 to ribs R.

Anchoring arms 304 hold subcutaneous device 300 in position on ribs R. When subcutaneous device 300 is anchored to ribs R, prong 306 will extend from housing 302 and be positioned adjacent to blood vessels B of the patient. Specifically, therapeutic portion 370 and electrode 372 of prong 306 will be positioned adjacent to one blood vessel B. Blood vessel B is an artery positioned over heart H in the embodiment shown in FIGS. 13A-14B. A pulsating electrical stimulation can be applied to create a pulsating electric field around blood vessels B, which include the one blood vessel B positioned adjacent to electrode 372 on prong 306 and other blood vessels near the one blood vessel B. The pulsating electrical stimulation creates a pulsating electric field around blood vessels B by transmitting the pulsating electrical signals from electrode 372 on distal end 362 of prong 306 into an area surrounding blood vessels B. Prong 306 can be shaped to be positioned adjacent to any blood vessels B surrounding heart H or any other blood vessels B that can be reached with prong 306. Specifically, prong 306 can be shaped to be positioned adjacent to any blood vessels B around the right ventricle, left ventricle, right atrium, or left atrium of heart H. Further, the energy level of the electrical stimulation that is applied to create the electric field around blood vessels B can be adjusted to vary the scope of the electric field. The energy level should be low enough that the electrical stimulation will not pulse or shock heart H.

Subcutaneous device 300 can be implanted with a simple procedure where subcutaneous device 300 is injected onto ribs R using a surgical instrument. The surgical procedure for implanting subcutaneous device 300 is less invasive than the surgical procedure required for more traditional medical devices, as subcutaneous device 300 is placed subcutaneously in the body. Anchoring subcutaneous device 300 to ribs R via anchoring arms 304 ensures that subcutaneous device 300 will not migrate in the patient's body. Maintaining the position of subcutaneous device 300 in the body ensures that prong 306 is properly positioned adjacent to one blood vessel B. Further, subcutaneous device 300 is able to accurately and reliably provide therapeutic pulsating electrical stimulation to create a pulsating electric field around blood vessels B, as subcutaneous device 300 will not move in the patient's body.

Further, creating a pulsating electrical field around blood vessels B with subcutaneous device 300 prevents plaque from building up in blood vessels B and can break up plaque that is already built-up in blood vessels B. Subcutaneous device 300 can be cycled on and off as needed and can be kept in a patient for an extended period of time. Subcutaneous device 300 can include a rechargeable battery that can be recharged on a periodic basis, for example yearly, to extend the life of subcutaneous device 300. The use of subcutaneous device 300 prevents a patient from having to take statins, which can have serious side effects to the patient, and can prevent plaque build-up in blood vessels B, which can prevent the patient from experiencing a heart attack or stroke and potentially having to undergo a surgical procedure to treat an occlusion caused by a plaque build-up. Subcutaneous device 300 may be suited for use in patients with other medical conditions that make traditional atherosclerosis treatments difficult. For example, diabetic patients can have small arteries, which can make it difficult or impossible to stent the arteries. Diabetic patients may be served by the prophylactic use of subcutaneous device 300 to prevent plaque build-up if they exhibit risk factors for atherosclerosis. Subcutaneous device 300 can also be used in conjunction with a pacemaker or defibrillator device.

Subcutaneous Device 500

FIG. 15 is a perspective view of subcutaneous device 500. Subcutaneous device 500 includes housing 502, clip 504, prong 506A, and prong 506B. Housing 502 includes first side 510, second side 512, top side 514, bottom side 516, front end 518, back end 520, receiving portion 522 (which has body 524 (not shown in FIG. 15) and coupler 526 (not shown in FIG. 15)), and guide 530. Clip 504 includes anchoring portion 540, mast portion 542, front end 544, back end 546, top side 548, bottom side 550, front portion 552, back portion 554, openings 555, center portion 556, tines 557, and pins 558 (not shown in FIG. 15). Body 524 of receiving portion 522 includes opening 560 (not shown in FIG. 15) and window 562 (not shown in FIG. 15). Coupler 526 of receiving portion 522 includes mating portion 564 (not shown in FIG. 15) having slots 566 (not shown in FIG. 15) and bottom portion 568 (not shown in FIG. 15). Prong 506A includes proximal end 570A (not shown in FIG. 15), distal end 572A, base portion 574A (not shown in FIG. 15), arm portion 578A, therapeutic portion 580A, and electrode 582A. Prong 506B includes proximal end 570B (not shown in FIG. 15), distal end 572B, base portion 574B (not shown in FIG. 15), arm portion 578B, therapeutic portion 580B, and electrode 582B.

Subcutaneous device 500 includes housing 502, clip 504, prong 506A, and prong 506B. Housing 502 has the same general structure and design as housing 102 of subcutaneous device 100 shown in FIGS. 1-8B. However, receiving portion 522 of housing 502 is configured to receive two prongs, including prong 506A and prong 506B. The reference numerals that refer to the parts of housing 502 are incremented by four-hundred compared to the reference numerals that refer to the parts of housing 102 of subcutaneous device 100 shown in FIGS. 1-8B.

Clip 504 has the same general structure and design as clip 104 of subcutaneous device 100 shown in FIGS. 1-8B. The reference numerals that refer to the parts of clip 504 are incremented by four-hundred compared to the reference numerals that refer to the parts of clip 104 of subcutaneous device 100 shown in FIGS. 1-8B. In one example, subcutaneous device 500 can be anchored to a xiphoid process and/or sternum of a patient. Clip 504 is configured to anchor subcutaneous device 500 to the xiphoid process and/or sternum.

Prong 506A and prong 506B each include the same parts as prong 106 of subcutaneous device 100 as shown in FIGS. 1-8B, and the reference numerals that refer to the parts of prong 506A and prong 506B are incremented by four-hundred compared to the reference numerals that refer to the parts of prong 106 of subcutaneous device 100 shown in FIGS. 1-8B. However, prong 506A and 506B have different shapes. Prong 506A has the same shape as prong 106 of subcutaneous device 100 shown in FIGS. 1-8B. Prong 506B has a generally similar shape as prong 506A, but extends further outwards from front end 518 of housing 502.

Subcutaneous device 500 can include a power source, a controller, a memory, a transceiver, electrodes, and/or any other component of a medical device. In the embodiment shown in FIG. 15, electrode 582A is positioned on therapeutic portion 580A at distal end 572A of first prong 506A. Electrode 582B is positioned on therapeutic portion 580B at distal end 572B of second prong 506B. Electrode 582A and electrode 582B are electrically coupled to therapeutic circuitry in housing 502 of subcutaneous device 500. In a first embodiment, the therapeutic circuitry can be configured to provide a pulsating electrical stimulation to electrode 582A and/or 582B to create a pulsating electric field between and around electrode 582A and electrode 582B. In this embodiment, electrode 582A can serve as a positive electrode and electrode 582B can serve as a negative electrode, or vice versa. Any blood vessels positioned in the pulsating electric field created between and around electrode 582A and electrode 582B will receive the therapeutic electrical stimulation from the pulsating electric field to prevent the build-up of plaque and break up already built-up plaque in the blood vessels. In a second embodiment, the therapeutic circuitry can be configured to provide a pulsating electrical stimulation to electrode 582A and 582B to create a first pulsating electric field between and around electrode 582A and housing 502 and a second pulsating electric field between and around electrode 582B and housing 502. In this embodiment, electrode 582A and electrode 582B serve as negative electrodes and housing 502 serves as a positive electrode. Respective blood vessels positioned in the respective first or second pulsating electric fields created between and around electrode 582A and housing 502 or between and around electrode 582B and housing 502 will receive the therapeutic electrical stimulation from the first or second pulsating electric fields to prevent the build-up of plaque and break up already built-up plaque in the blood vessels.

Subcutaneous Device 600

FIG. 16 is a perspective view of subcutaneous device 600. Subcutaneous device 600 includes housing 602, anchoring arms 604 (including first anchoring arm 604A and second anchoring arm 604B), and prong 606. Housing 602 includes first side 610, second side 612, top side 614, bottom side 616, front end 618, back end 620, and receiving tube 622. Anchoring arm 604A includes body 640A, housing side 642A, outer side 644A, top side 646A, bottom side 648A, opening 650A, and tines 652A. Anchoring arm 604B includes body 640B, housing side 642B, outer side 644B, top side 646B, bottom side 648B, opening 650B, and tines 652B. Prong 606A includes proximal end 660A, distal end 662A, base portion 664A, arm portion 668A, therapeutic portion 670A, and electrode 672A. Prong 506B includes proximal end 660B, distal end 662B, base portion 664B, arm portion 668B, therapeutic portion 670B, and electrode 672B.

Subcutaneous device 600 includes housing 602, anchoring arms 604, prong 606A, and prong 606B. Housing 602 has the same general structure and design as housing 302 of subcutaneous device 300 shown in FIGS. 9-14B. However, receiving tube 622 of housing 602 is configured to receive two prongs, including prong 606A and prong 606B. The reference numerals that refer to the parts of housing 602 are incremented by three-hundred compared to the reference numerals that refer to the parts of housing 302 of subcutaneous device 300 shown in FIGS. 9-14B.

Anchoring arms 604 has the same general structure and design as anchoring arms 304 of subcutaneous device 300 shown in FIGS. 9-14B. The reference numerals that refer to the parts of anchoring arms 604 are incremented by three-hundred compared to the reference numerals that refer to the parts of anchoring arms 304 of subcutaneous device 300 shown in FIGS. 9-14B. In one example, subcutaneous device 600 can be anchored to ribs of a patient. Anchoring arms 604 are configured to anchor subcutaneous device 600 to the ribs.

Prong 606A and prong 606B each include the same parts as prong 306 of subcutaneous device 300 as shown in FIGS. 9-14B, and the reference numerals that refer to the parts of prong 606A and prong 606B are incremented by three-hundred compared to the reference numerals that refer to the parts of prong 306 of subcutaneous device 300 shown in FIGS. 9-14B. However, prong 606A and 606B have different shapes. Prong 606A has the same shape as prong 306 of subcutaneous device 300 shown in FIGS. 9-14B. Prong 606B has a generally similar shape as prong 606A, but extends further outwards from housing 602.

Subcutaneous device 600 can include a power source, a controller, a memory, a transceiver, electrodes, and/or any other component of a medical device. In the embodiment shown in FIG. 16, electrode 672A is positioned on therapeutic portion 670A at distal end 662A of first prong 606A. Electrode 672B is positioned on therapeutic portion 670B at distal end 662B of second prong 606B. Electrode 672A and electrode 672B are electrically coupled to therapeutic circuitry in housing 602 of subcutaneous device 600. In a first embodiment, the therapeutic circuitry can be configured to provide a pulsating electrical stimulation to electrode 672A and/or 672B to create a pulsating electric field between and around electrode 672A and electrode 672B. In this embodiment, electrode 672A can serve as a positive electrode and electrode 672B can serve as a negative electrode, or vice versa. Any blood vessels positioned in the pulsating electric field created between and around electrode 672A and electrode 672B will receive the therapeutic electrical stimulation from the pulsating electric field to prevent the build-up of plaque and break up already built-up plaque in the blood vessels. In a second embodiment, the therapeutic circuitry can be configured to provide a pulsating electrical stimulation to electrode 672A and 672B to create a first pulsating electric field between and around electrode 672A and housing 602 and a second pulsating electric field between and around electrode 672B and housing 602. In this embodiment, electrode 672A and electrode 672B serve as negative electrodes and housing 602 serves as a positive electrode. Respective blood vessels positioned in the respective first and second pulsating electric fields created between and around electrode 672A and housing 602 or between and around electrode 672B and housing 602 will receive the therapeutic electrical stimulation from the first or second pulsating electric fields to prevent the build-up of plaque and break up already built-up plaque in the blood vessels.

Subcutaneous devices 100, 300, 500, and 600 disclose various embodiments of the subcutaneous devices, including: a single prong device with a clip attached to the housing, a multi-prong device with a clip attached to the housing, a single prong device with anchoring arms attached to the housing, and a multi-prong device with anchoring arms attached to the housing. The features of each embodiment may be combined and/or substituted with features of any other embodiment, unless explicitly disclosed otherwise.

Discussion of Possible Embodiments

The following are non-exclusive descriptions of possible embodiments of the present invention.

A subcutaneously implantable device includes a housing and an anchoring mechanism attached to the housing that is configured to anchor the device to a muscle, a bone, and/or a first tissue. The device further includes a first prong with a proximal end attached to the housing and a distal end extending away from the housing that is configured to be positioned adjacent to a first blood vessel, and a first electrode on the distal end of the first prong that is configured to be positioned adjacent to the first blood vessel. Circuitry in the housing is in electrical communication with the first electrode that is configured to deliver electrical stimulation using the electrode to create an electric field around the blood vessel.

The device of the preceding paragraph can optionally include, additionally and/or alternatively, any one or more of the following features, configurations and/or additional components:

Wherein the anchoring mechanism comprises a clip attached to the housing.

Wherein the clip is configured to move between an open position and a closed position to increase or decrease an opening between the housing and the clip to anchor the device to the muscle, the bone, and/or the first tissue.

Wherein the clip comprises at least one tine configured to pierce the muscle, the bone, and/or the first tissue.

Wherein the at least one tine is configured to bend back around into the muscle, the bone, and/or the first tissue as the clip is moved from an open position to a closed position.

Wherein the clip is configured to be anchored to a xiphoid process and/or a sternum of a patient.

Wherein the anchoring mechanism comprises a first anchoring arm attached to a first side of the housing.

Wherein the first anchoring arm comprises at least one tine configured to pierce the muscle, the bone, and/or the first tissue.

Wherein the anchoring mechanism further comprises a second anchoring arm attached to a second side of the housing.

Wherein the first anchoring arm and the second anchoring arm each comprises at least one tine configured to pierce the muscle, the bone, and/or the first tissue.

Wherein the first anchoring arm and the second anchoring arm are integrally formed with the housing.

Wherein the first anchoring arm and the second anchoring arm are configured to be anchored to a first rib and a second rib, respectively, in a patient.

Wherein the first prong is made of a stiff material that is capable of pushing through tissue in a body of a patient.

Wherein the first prong is made out of a material selected from the group consisting of nickel titanium (Nitinol), silicone, polyurethane, stainless steel, titanium, epoxy, polyurethane with metallic reinforcements, and any combination thereof.

Wherein the first prong further includes a base portion on the proximal end of the first prong, an arm portion extending from the base portion, and a therapeutic portion extending from the arm portion and termination at the distal end of the first prong, wherein the first electrode is positioned on the therapeutic portion of the first prong.

Wherein the electrical stimulation that is provided using the first electrode is pulsating electrical stimulation to create a pulsating electric field between and around the first electrode and the housing.

Wherein a frequency of the pulsating electrical stimulation is between 1 pulse per minute and 30 pulses per minute.

Wherein an amplitude of the pulsating electrical simulation is between 0.5 volts and 4.0 volts at a pulse width of 250 milliseconds to 1000 milliseconds.

The device further includes a second prong with a proximal end attached to the housing and a distal end extending away from the housing that is configured to be positioned adjacent to a second blood vessel, and a second electrode on the distal end of the first prong that is configured to be positioned adjacent to the second blood vessel, wherein the circuitry in the housing is in electrical communication with the second electrode and is configured to deliver electrical stimulation using the second electrode to create an electric field around the second blood vessel.

Wherein the electrical stimulation that is provided using the first electrode and the second electrode is pulsating electrical stimulation to create a pulsating electric field between and around the first electrode and the second electrode.

Wherein the electrical stimulation that is provided using the first electrode and the second electrode is pulsating electrical stimulation to create a pulsating electric field between and around the first electrode and the housing and between and around the second electrode and the housing.

A method of preventing and treating atherosclerosis using a subcutaneous device includes anchoring a housing of the device to a muscle, a bone, and/or a first tissue using an anchoring mechanism attached to the housing. Electrical stimulation is transmitted from circuitry in the housing to a first electrode on a distal end of a first prong positioned adjacent to a first blood vessel, thereby creating an electric field around the first blood vessel. The first prong has a proximal end attached to the housing and the distal end extends away from the housing. An electric field is created around the first blood vessel with the electrical stimulation from the first electrode.

The method of the preceding paragraph can optionally include, additionally and/or alternatively, any one or more of the following features, configurations and/or additional components:

Wherein anchoring the housing of the device to the muscle, the bone, and/or the first tissue using the anchoring mechanism attached to the housing comprises anchoring the housing of the device to the muscle, the bone, and/or the first tissue using a clip attached to the housing.

The method further includes anchoring the clip of the housing to a xiphoid process and/or sternum of a patient.

Wherein anchoring the housing of the device to the muscle, the bone, and/or the first tissue using the anchoring mechanism attached to the housing comprises anchoring the housing of the device to the muscle, the bone, and/or the first tissue using anchoring arms attached to the housing.

The method further includes anchoring the anchoring arms of the housing to ribs of a patient.

Wherein the first prong is made of a stiff material that is capable of pushing through tissue in a body of a patient.

Wherein the electrical stimulation that is provided using the first electrode is pulsating electrical stimulation to create a pulsating electric field between and around the first electrode and the housing.

The method further includes transmitting electrical stimulation from the circuitry in the housing to a second electrode on a distal end of a second prong, so that the electric field is created between and around the first electrode and the second electrode, wherein the second prong has a proximal end attached to the housing and the distal end extends away from the housing.

The method further includes transmitting electrical stimulation from the circuitry in the housing to a second electrode on a distal end of a second prong positioned adjacent to a second blood vessel, thereby creating an electric field between and around the second blood vessel, wherein the second prong has a proximal end attached to the housing and the distal end extends away from the housing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A subcutaneously implantable device comprising:
    a housing;
    a clip attached to the housing that is configured to anchor the device to a muscle and/or a bone, wherein the clip has an anchoring portion that extends along a top side of the housing and a mast portion that extends away from a back end of the anchoring portion and along a back end of the housing, wherein the anchoring portion and the mast portion are configured to move up and down with respect to the housing to increase or decrease an opening between the housing and the anchoring portion of the clip to anchor the device to the muscle and/or the bone;
    a first stiff prong with a proximal end attached to the housing and a distal end extending away from the housing that is configured to be positioned adjacent to a first blood vessel;
    a first electrode on the distal end of the first stiff prong that is configured to be positioned adjacent to the first blood vessel; and
    circuitry in the housing in electrical communication with the first electrode that is configured to deliver electrical stimulation using the first electrode to create an electric field around the first blood vessel.

2. The device of claim 1, wherein the clip comprises at least one tine configured to pierce the muscle and/or the bone, and wherein the at least one tine is configured to bend back around into the muscle and/or the bone as the clip is moved from an open position to a closed position.

3. The device of claim 1, wherein the clip is configured to be anchored to a xiphoid process and/or a sternum of a patient.

4. The device of claim 1, wherein the first stiff prong is made of a material having sufficient stiffness to be capable of pushing through tissue in a body of a patient.

5. The device of claim 4, wherein the first stiff prong is made out of a material selected from the group consisting of nickel titanium (Nitinol), silicone, polyurethane, stainless steel, titanium, epoxy, polyurethane with metallic reinforcements, and any combination thereof.

6. The device of claim 1, wherein the first stiff prong further comprises:
    a base portion on the proximal end of the first stiff prong;
    an arm portion extending from the base portion; and
    a therapeutic portion extending from the arm portion and termination at the distal end of the first stiff prong, wherein the first electrode is positioned on the therapeutic portion of the first stiff prong.

7. The device of claim 1, wherein the electrical stimulation that is provided using the first electrode is pulsating electrical stimulation to create a pulsating electric field between and around the first electrode and the housing.

8. The device of claim 7, wherein a frequency of the pulsating electrical stimulation is between 1 pulse per minute and 30 pulses per minute.

9. The device of claim 7, wherein an amplitude of the pulsating electrical simulation is between 0.5 volts and 4.0 volts at a pulse width of 250 milliseconds to 1000 milliseconds.

10. The device of claim 1, and further comprising:
    a second stiff prong with a proximal end attached to the housing and a distal end extending away from the housing that is configured to be positioned adjacent to a second blood vessel; and
    a second electrode on the distal end of the second stiff prong that is configured to be positioned adjacent to the second blood vessel;
    wherein the circuitry in the housing is in electrical communication with the second electrode and is configured to deliver electrical stimulation using the second electrode to create an electric field around the second blood vessel.

11. The device of claim 10, wherein the electrical stimulation that is provided using the first electrode and the second electrode is pulsating electrical stimulation to create a pulsating electric field between and around the first electrode and the second electrode.

12. The device of claim 10, wherein the electrical stimulation that is provided using the first electrode and the second electrode is pulsating electrical stimulation to create a pulsating electric field between and around the first electrode and the housing and a pulsating electric field between and around the second electrode and the housing.

13. The device of claim 1, wherein the first stiff prong is made of a material having sufficient stiffness to be capable of pushing through tissue in a mediastinum of a patient.

14. The device of claim 1, wherein the distal end of the first stiff prong is unanchored.

15. The device of claim 1, wherein the distal end of the first stiff prong is not in contact with the first blood vessel.

16. The device of claim 1, wherein the first electrode is configured to form a vector with the housing.

17. The device of claim 16, wherein the electric field extends between and around the first electrode and the housing.

18. The device of claim 1, wherein the first electrode is configured to form a vector with a second electrode on the housing or the clip.

19. The device of claim 18, wherein the electric field extends between and around the first electrode and the second electrode.

20. A method of preventing and treating atherosclerosis using a subcutaneous device, the method comprising:

anchoring a housing of the device to a muscle and/or a bone using a clip attached to the housing, wherein the clip has an anchoring portion that extends along a top side of the housing and a mast portion that extends away from a back end of the anchoring portion and along a back end of the housing, wherein the anchoring portion and the mast portion are configured to move up and down with respect to the housing to increase or decrease an opening between the housing and the anchoring portion of the clip to anchor the device to the muscle and/or the bone;

pushing a first stiff prong through tissue to position a distal end of the first stiff prong adjacent to a first blood vessel, wherein the first stiff prong has a proximal end attached to the housing and the distal end that extends away from the housing; and transmitting electrical stimulation from circuitry in the housing to a first electrode on the distal end of the first stiff prong positioned adjacent to the first blood vessel, thereby creating an electric field around the first blood vessel.

21. The method of claim 20, and further comprising:
anchoring the clip of the housing to a xiphoid process and/or sternum of a patient.

22. The method of claim 20, wherein the electrical stimulation that is provided using the first electrode is pulsating electrical stimulation to create a pulsating electric field between and around the first electrode and the housing.

23. The method of claim 20, and further comprising:
transmitting electrical stimulation from the circuitry in the housing to a second electrode on a distal end of a second stiff prong, so that the electric field is created between and around the first electrode and the second electrode, wherein the second stiff prong has a proximal end attached to the housing and the distal end extends away from the housing.

24. The method of claim 20, and further comprising:
transmitting electrical stimulation from the circuitry in the housing to a second electrode on a distal end of a second stiff prong positioned adjacent to a second blood vessel, thereby creating an electric field between and around the second blood vessel, wherein the second stiff prong has a proximal end attached to the housing and the distal end extends away from the housing.

25. The method of claim 20, wherein transmitting electrical stimulation from circuitry in the housing to the first electrode on the distal end of the first stiff prong positioned adjacent to the first blood vessel comprises creating a vector between the first electrode and the housing.

26. The method of claim 25, wherein the electric field extends between and around the first electrode and the housing.

27. The method of claim 20, wherein transmitting electrical stimulation from circuitry in the housing to the first electrode on the distal end of the first stiff prong positioned adjacent to the first blood vessel comprises creating a vector between the first electrode and a second electrode on the housing or the clip.

28. The method of claim 27, wherein the electric field extends between and around the first electrode and the second electrode.

* * * * *